United States Patent
Tashiro et al.

(10) Patent No.: US 11,052,895 B2
(45) Date of Patent: Jul. 6, 2021

(54) VEHICLE CONTROL UNIT

(71) Applicant: Hitachi Automotive Systems, Ltd., Hitachinaka (JP)

(72) Inventors: Naoyuki Tashiro, Hitachinaka (JP); Takashi Okada, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/314,567

(22) PCT Filed: Aug. 2, 2017

(86) PCT No.: PCT/JP2017/027986
§ 371 (c)(1),
(2) Date: Dec. 31, 2018

(87) PCT Pub. No.: WO2018/061469
PCT Pub. Date: Apr. 5, 2018

(65) Prior Publication Data
US 2019/0168732 A1    Jun. 6, 2019

(30) Foreign Application Priority Data

Sep. 28, 2016  (JP) .............................. JP2016-188984

(51) Int. Cl.
*B60W 10/06* (2006.01)
*F02D 29/02* (2006.01)
(Continued)

(52) U.S. Cl.
CPC ............ *B60W 10/06* (2013.01); *B60W 10/10* (2013.01); *B60W 10/18* (2013.01); *B60W 30/18* (2013.01);
(Continued)

(58) Field of Classification Search
CPC ........ F02D 29/02; F02D 41/10; F02D 41/107; B60W 10/06; B60W 10/10; B60W 10/18;
(Continued)

(56) References Cited

U.S. PATENT DOCUMENTS 5,720,690 A     2/1998  Hara et al.
8,265,850 B2 *  9/2012  Shin .................... B60W 10/184
                                                       701/93

(Continued)

FOREIGN PATENT DOCUMENTS

DE   10 2007 03679 A1   2/2009
EP       1 475 265 A2  11/2004
(Continued)

OTHER PUBLICATIONS

International Search Report and Written Opinion received in PCT/JP2017/027986 dated Nov. 28, 2017.
(Continued)

*Primary Examiner* — John Kwon
*Assistant Examiner* — Johnny H Hoang
(74) *Attorney, Agent, or Firm* — Foley & Lardner LLP

(57) ABSTRACT

When acceleration control is interrupted due to a lane change or the like, the engine speed is controlled from a high rotation speed to a low rotation speed, a variation in engine speed increases, and poor driver's driving performance is brought about. Furthermore, suppression of acceleration when there is a lane change possibility may rather cause the lane change and the driver feels discomfort. The vehicle control unit according to the present invention includes a target engine speed calculation unit which corrects a target engine speed to be reduced relative to a predetermined target engine speed when the acceleration/deceleration possibility determination unit determines that there is a deceleration possibility during acceleration to a target vehicle speed in
(Continued)

automatic acceleration/deceleration control, and an engine control unit which controls an engine to have a target engine speed corrected by the target engine speed calculation unit.

13 Claims, 16 Drawing Sheets

(51) Int. Cl.
*B60W 10/18* (2012.01)
*B60W 30/18* (2012.01)
*B60W 40/02* (2006.01)
*B60W 40/04* (2006.01)
*F02D 41/10* (2006.01)
*B60W 10/10* (2012.01)
*F02D 45/00* (2006.01)

(52) U.S. Cl.
CPC ...... *B60W 30/18163* (2013.01); *B60W 40/02* (2013.01); *B60W 40/04* (2013.01); *F02D 29/02* (2013.01); *F02D 41/107* (2013.01); *B60W 2710/0644* (2013.01); *F02D 45/00* (2013.01); *F02D 2200/101* (2013.01); *F02D 2200/501* (2013.01); *F02D 2200/701* (2013.01); *F02D 2200/702* (2013.01)

(58) Field of Classification Search
CPC ........... B60W 30/18; B60W 30/18163; B60W 40/02; B60W 40/04
USPC ................................. 701/101, 102, 110–115
See application file for complete search history.

(56) References Cited

U.S. PATENT DOCUMENTS

| | | | | |
|---|---|---|---|---|
| 8,930,115 B2* | 1/2015 | Filev | ................... | B60W 30/143 701/93 |
| 9,457,802 B2* | 10/2016 | Ponziani | .............. | B60W 10/198 |
| 2008/0059036 A1* | 3/2008 | Imai | .................... | B60W 30/143 701/93 |
| 2009/0157276 A1* | 6/2009 | Kade | ...................... | B60W 10/06 701/96 |
| 2009/0193802 A1* | 8/2009 | Usukura | ............... | F16H 61/462 60/431 |
| 2010/0044131 A1* | 2/2010 | Teraya | .................. | B60W 10/26 180/65.265 |
| 2010/0198450 A1* | 8/2010 | Shin | ...................... | B60W 30/14 701/31.4 |
| 2013/0013164 A1 | 1/2013 | Taguchi | | |
| 2013/0103274 A1* | 4/2013 | Binder | ................ | B60W 40/068 701/65 |
| 2013/0131940 A1* | 5/2013 | Yamamoto | ........ | F16H 61/66259 701/54 |
| 2013/0220273 A1* | 8/2013 | Yoshimatsu | ........ | F02D 13/0215 123/347 |
| 2013/0282215 A1* | 10/2013 | Makabe | ................ | B60W 10/02 701/22 |
| 2014/0375443 A1* | 12/2014 | Aoyagi | .................. | B60Q 5/008 340/425.5 |
| 2015/0375747 A1 | 12/2015 | Shishido et al. | | |
| 2016/0009278 A1 | 1/2016 | Roos | | |
| 2016/0144866 A1* | 5/2016 | Seo | ..................... | H04L 12/4633 701/1 |
| 2016/0153374 A1* | 6/2016 | Tashiro | .................. | F02D 41/10 701/103 |
| 2016/0201294 A1 | 7/2016 | Aoki et al. | | |
| 2017/0113686 A1* | 4/2017 | Horita | ................... | B60W 40/06 |
| 2017/0369055 A1* | 12/2017 | Saigusa | ............. | B60W 30/0956 |
| 2018/0178796 A1* | 6/2018 | Fukuda | ........... | B60W 30/18163 |
| 2018/0222462 A1* | 8/2018 | Varnhagen | .............. | B60T 8/172 |
| 2018/0229729 A1* | 8/2018 | McQuillen | ........ | B60W 50/0098 |
| 2019/0025843 A1* | 1/2019 | Wilkinson | ......... | G01C 21/3407 |
| 2019/0080602 A1* | 3/2019 | Rice | ................. | G08G 1/096725 |
| 2019/0113332 A1* | 4/2019 | Nishimura | ......... | H04N 5/35581 |
| 2019/0155307 A1* | 5/2019 | Hille | .................... | G05D 1/0278 |
| 2019/0205674 A1* | 7/2019 | Silver | ................ | G06K 9/00818 |
| 2019/0382021 A1* | 12/2019 | Niibo | .................... | B60W 10/20 |
| 2019/0382022 A1* | 12/2019 | Niibo | .................... | G08G 1/167 |
| 2019/0384305 A1* | 12/2019 | Niibo | .................... | B60W 10/18 |
| 2020/0079394 A1* | 3/2020 | Masuda | ............. | B60W 50/023 |

FOREIGN PATENT DOCUMENTS

| | | |
|---|---|---|
| JP | H09-9408 A | 1/1997 |
| JP | 2002-295283 A | 10/2002 |
| JP | 3736400 B2 | 1/2006 |
| JP | 2011-058434 A | 3/2011 |
| JP | 2012-047148 A | 3/2012 |
| JP | 2014-111397 A | 6/2014 |
| JP | 2015-113823 A | 6/2015 |
| JP | 2016-027278 A | 2/2016 |
| WO | WO 2014/148973 A1 | 9/2014 |

OTHER PUBLICATIONS

Extended European Search Report issued in corresponding Application No. EP 17855427.5 dated Dec. 16, 2020.

\* cited by examiner (i) TRAVELING ALONE (ii) FOLLOWING PRECEDING VEHICLE (iii) WITHDRAWAL OF PRECEDING VEHICLE (iv) OVERTAKING PRECEDING VEHICLE (i) TRAVELING ALONE (ii) RIGHT BEFORE CURVE (iii) FOLLOWING PRECEDING VEHICLE (iv) MERGING IN FRONT OF HOST VEHICLE (v) LANE CHANGE (vi) CUTTING IN OF PARALLEL RUNNING VEHICLE

VEHICLE CONTROL UNIT

CROSS-REFERENCE TO RELATED APPLICATIONS

This application is a National Phase of International Patent Application No. PCT/JP2017/027986, filed Aug. 2, 2017, which claims priority to Japanese Patent Application No. 2016-188984, filed Sep. 28, 2016. The contents of these applications are herein incorporated by reference in their entirety.

TECHNICAL FIELD

The present invention relates to a vehicle control unit for controlling an engine.

BACKGROUND ART

PTL 1 is available as a background art in this technical field. In PTL 1, a lower limit vehicle speed and an upper limit vehicle speed are set, when vehicle speed becomes equal to or higher than the upper limit vehicle speed, an engine is stopped, a clutch between the engine and wheels is released, causing the vehicle coast, and when vehicle speed becomes lower than or equal to the lower limit vehicle speed, the engine is started and accelerated through engaging the clutch. In addition, PTL 1 discloses a technology for controlling gear ratio so as to drive the engine in an optimal fuel consumption region thereof in acceleration control.

PTL 2 discloses a technology for determining a lane change possibility on the basis of information about a vehicle on another lane and applying reduced acceleration without frightening a driver when there is a lane change possibility.

CITATION LIST

Patent Literature

PTL 1: JP 2012-47148 A
PTL 2: JP 3736400 B2

SUMMARY OF INVENTION

Technical Problem

In PTL 1, to drive an engine in an optimal fuel consumption region thereof, a gear ratio is controlled and engine speed is increased. At that time, when acceleration control is interrupted due to a lane change or the like, there is a problem that the engine speed is controlled from a high rotation speed to a low rotation speed, a variation in engine speed increases, and poor driver's driving performance is brought about.

In addition, in the above-mentioned PTL 2, suppression of acceleration when there is a lane change possibility may rather cause the lane change and the driver feels discomfort.

Solution to Problem

In order to solve the above-mentioned problems, a vehicle control unit according to the present invention includes a surrounding vehicle information acquisition unit which acquires surrounding information around a host vehicle, an acceleration/deceleration possibility determination unit which determines acceleration possibility or deceleration possibility of a host vehicle on the basis of surrounding information from the surrounding vehicle information acquisition unit, a target engine speed calculation unit which corrects a target engine speed to be reduced relative to a predetermined target engine speed when the acceleration/deceleration possibility determination unit determines that there is a deceleration possibility during acceleration to a target vehicle speed in automatic acceleration/deceleration control, and an engine control unit which controls an engine to have a target engine speed corrected by the target engine speed calculation unit.

Advantageous Effects of Invention

During acceleration, driving an engine at an operating point with high engine efficiency improves fuel consumption, and when there is an acceleration/deceleration possibility, maintaining a target acceleration prevents poor driver's driving performance due to variation in engine speed while maintaining drive performance.

DESCRIPTION OF EMBODIMENTS

Hereinafter, embodiments according to the present invention will be described with reference to the drawings.

First Embodiment

Figure 1:
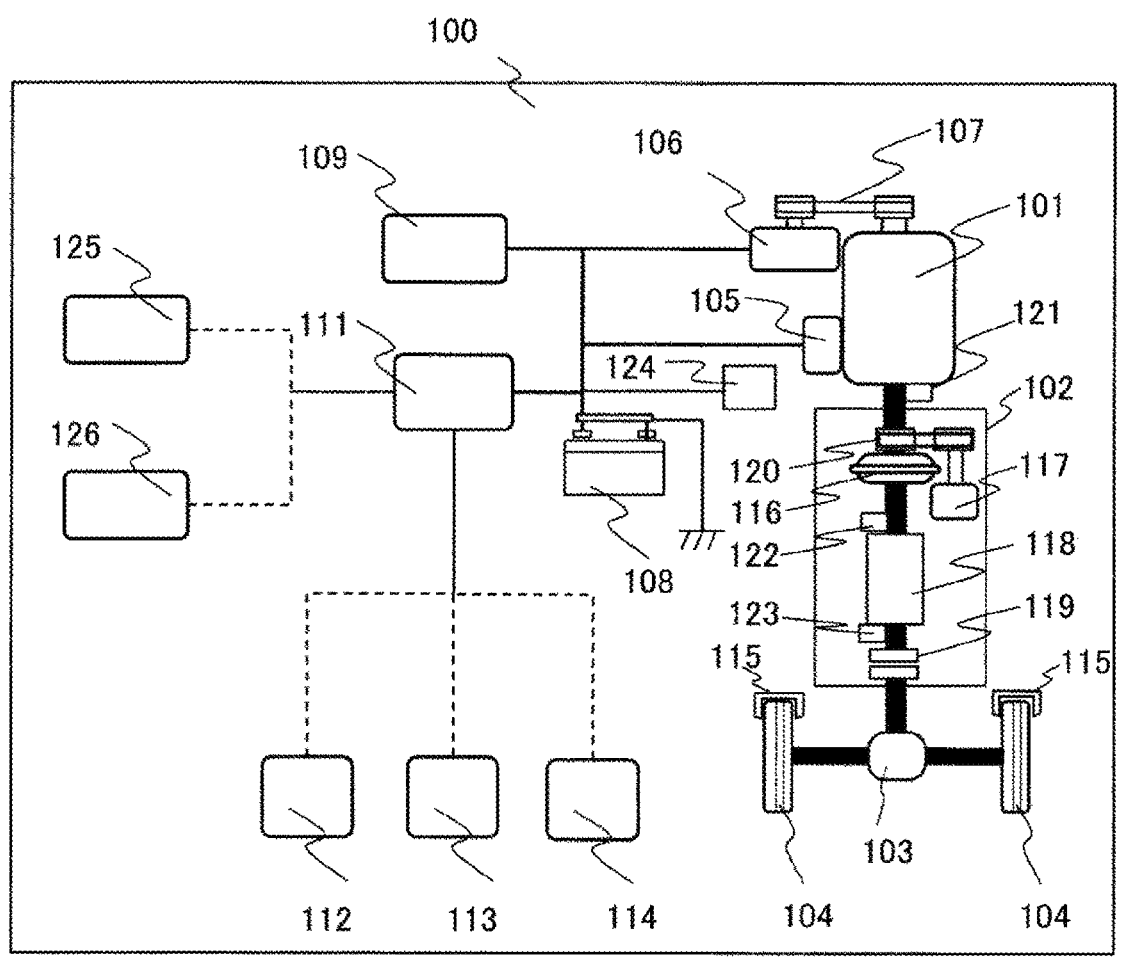
FIG. 1 is a diagram illustrating a configuration of a vehicle including a vehicle control unit according to a first embodiment of the present invention.

FIG. 1 is a diagram illustrating a configuration of a vehicle including a vehicle control unit according to a first embodiment of the present invention. As illustrated in FIG. 1, the vehicle 100 includes an engine 101, a driving force generated by the engine 101 is transmitted to wheels 104 connected via a differential mechanism 103, through a transmission 102, thereby causing the vehicle 100 to travel. In order to decelerate the vehicle 100, each wheel 104 is provided with a brake mechanism 115, and a braking force is changed depending on the pressing amount of a brake pad in the brake mechanism 115 to adjust the speed of the vehicle 100.

The transmission 102 includes a torque converter 116, a transmission oil pump 117, a transmission mechanism 118, and a clutch mechanism 119 capable of transmitting and interrupting power from the engine 101 to the wheels 104. When a rotational difference occurs between the input side and the output side of the torque converter 116, a torque amplifying action is produced. Therefore, when a sudden acceleration is required, a large driving force can be obtained by increasing engine speed. In contrast, when there is a rotation difference, torque transmission is inefficient. Therefore, when rapid acceleration is unnecessary, transmission efficiency is raised by engaging a lock-up clutch provided in the torque converter. Furthermore, by engaging the lock-up clutch during traveling, even when fuel supply to the engine is stopped, the engine is rotated by using a turning force from the wheels (hereinafter referred to as engine braking).

Furthermore, the transmission oil pump 117 is driven through an oil pump drive chain 120. Here, the transmission mechanism 118 is not limited to a stepped transmission, and may use a continuously variable transmission having a combination of a belt or chain and a pulley. The position of the clutch mechanism 119 is not limited to between the transmission mechanism 118 and the differential mechanism 103, and the clutch mechanism 119 may be provided between the oil pump drive chain 120 and the transmission mechanism 118. The transmission 102 includes a transmission input speed sensor 122 for measuring the rotation speed of an input shaft and a transmission output speed sensor 123 for measuring the rotation speed of an output shaft. Furthermore, when the engine stops, the transmission oil pump 117 is not driven, and insufficient hydraulic pressure is provided to maintain gear ratio. Therefore, an electric oil pump 124 for transmission is provided to secure the hydraulic pressure of the transmission while the engine is stopped, and by supplying electric power from a battery 108, necessary oil pressure is secured.

A starter motor 105 is assembled to the engine 101 as a starter, and electric power is supplied from the battery 108, the starter motor 105 is driven, and in conjunction with the rotation of the starter motor 105, the engine 101 also rotates. Here, the engine starter is not limited to the starter motor 105 and may be a motor having functions of both of a starter motor and a generator. An engine speed sensor 121 for detecting engine speed is attached to the engine 101. The starter motor 105 is driven, fuel supply is started after the engine has a speed not less than a predetermined value, and the fuel is ignited to start the engine.

A generator 106 is connected to the engine 101 via a drive belt 107. The generator 106 can generate electric power by being rotated following the rotation of the crankshaft. The generator 106 has a mechanism for varying generated voltage by controlling field current, and it is also possible to stop power generation output. Electric power generated by the generator 106 is supplied to the battery 108 and an in-vehicle electric component 109. The in-vehicle electric component 109 includes an actuator for operating the engine 101, such as a fuel supply device and an ignition device, and a controller 111 for controlling the fuel supply device and the ignition device. The in-vehicle electrical component 109 includes a lighting device, such as a headlight, a brake lamp, and a direction indicator, and an air conditioner, such as a blower fan and a heater.

The controller 111 receives input of information detected by an accelerator pedal position detection unit 112 for detecting the position of an accelerator pedal, a brake pedal position detection unit 113 for detecting the position of a brake pedal, and a vehicle speed detection unit 114 for detecting the speed of the vehicle.

The brake mechanism 115 may include not only a mechanism in which a pressing amount of a brake pad varies according to the position of the brake pedal pressed by the driver and a braking force is controlled, but also an electric actuator mechanism for changing the pressing amount in accordance with a command value from the controller 111.

Furthermore, at least one of a surrounding road information acquisition unit 125 and a surrounding vehicle information acquisition unit 126 is provided to acquire circumstances around a host vehicle, and transmits information to the controller 111. Here, the surrounding road information acquisition unit 125 desirably acquires information about the number of lanes along which the host vehicle travels, information about a curve (distance to a curve, curvature, the length of a curve, and the like), information about an intersection (distance to an intersection, stopping or not stopping before crossing, a Cross road, a T-junction, presence/absence of traffic signals, current states of traffic signals, switching timing of traffic signals, and the like). Alternatively, the surrounding road information acquisition unit 125 may use not only road-to-vehicle communication or a digital map, but also a result recognized by a camera or the like. In addition, the surrounding vehicle information acquisition unit 126 desirably acquires information about a vehicle not only on forward and backward directions but also a vehicle around the host vehicle including a vehicle on a lateral direction (position, speed, acceleration, turning signal, steering, and the like), which may be acquired not only by a camera or radar but also by inter-vehicle communication. A control method according to the present embodiment will be described in detail with reference to FIGS. 2 to 6. FIG. is a control block diagram of the controller 111 according to the present embodiment. An acceleration/deceleration possibility determination unit 201 determines an acceleration/deceleration possibility of the host vehicle on the basis of surrounding vehicle information from the surrounding vehicle information acquisition unit 126 and surrounding road information from the surrounding road information acquisition unit 125. More specifically, a process illustrated in FIG. 3 is performed. In step S301 of FIG. 3, it is determined whether automatic acceleration/deceleration control is being performed. More specifically, it is determined whether the driver operates a steering wheel switch and the like to perform automatic acceleration/deceleration control. Here, automatic acceleration/deceleration means that the vehicle is controlled to be automatically accelerated or decelerated by the controller 111 (engine control unit) without driver's accelerator operation or brake operation. In step S302, the controller 111 detects the acceleration of the vehicle 100, and determines that the vehicle 100 is decelerating when the acceleration of the vehicle 100 is negative.

Figure 4:
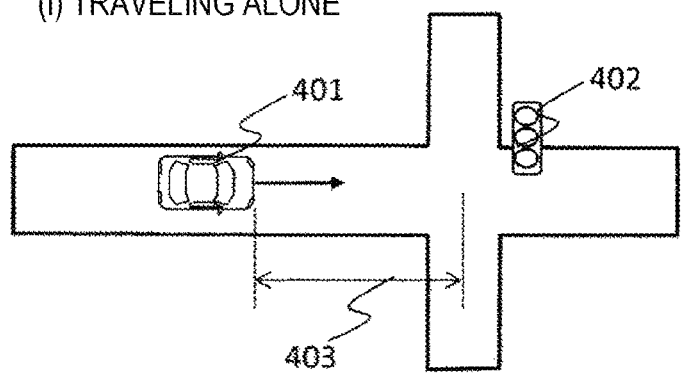
FIG. 4 is a running scene illustrating determination of an acceleration possibility according to the first embodiment of the present invention.
Figure 4:
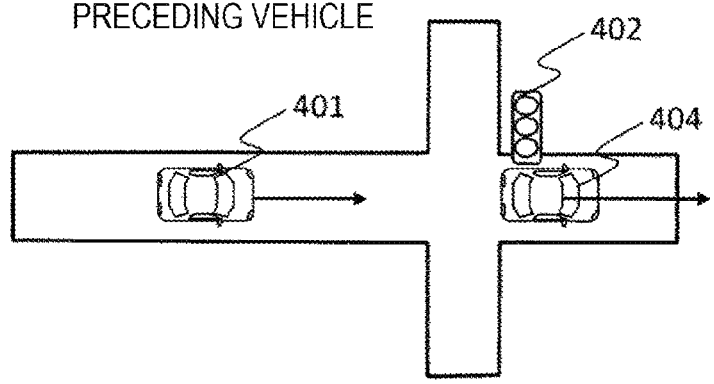
Figure 4:
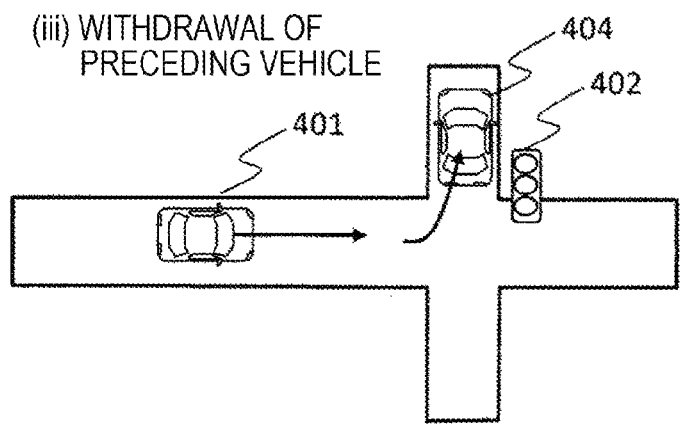
Figure 4:
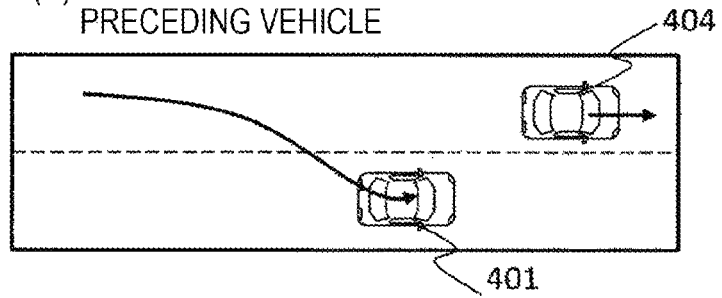

In step S303, the controller 111 determines an acceleration possibility by using at least one of the surrounding road information acquisition unit 125 and the surrounding vehicle information acquisition unit 126. Specifically, as illustrated in FIG. 4, at an intersection with a traffic signal, while the host vehicle 401 is traveling alone (i), an acceleration possibility is determined according to the color of the traffic signal 402 and a distance 403 to the intersection. For example, when the traffic signal 402 is blue and the distance 403 to the intersection is equal to or less than a set value, it is determined that there is an acceleration possibility.

Furthermore, when the host vehicle 401 is following a preceding vehicle 404 (ii), where the color of the traffic signal 402 is blue and the acceleration of the preceding vehicle is positive, it is determined that there is an acceleration possibility. Note that the controller 111 detects the acceleration of the preceding vehicle on the basis of a signal from the surrounding vehicle information acquisition unit 126.

When the host vehicle 401 is following the preceding vehicle 404 and the preceding vehicle 404 is no longer in front of the host vehicle 401 due to a right or left turn or the like thereof (iii), where the traffic signal is blue, it is determined that there is an acceleration possibility. Here, the controller 111 decides the acceleration possibility, on the basis of information about detection of blinker signal of the preceding vehicle by the surrounding vehicle information acquisition unit 126, such as a camera, attached to the host vehicle 401 or detection that the preceding vehicle is being steered.

Next, when a request for overtaking the preceding vehicle 404 is detected (iv) where the host vehicle 401 follows the preceding vehicle 404 on a straight road or the like, it is determined that there is an acceleration possibility. As a method for detecting an overtaking request, it is determined whether there is a blinker signal from the host vehicle 401, and when there is a blinker signal and there is room for the host vehicle 401 to pass, it is determined that overtaking is to be performed. Here, the controller 111 determines whether passing is possible on the basis of the host vehicle 401, a road width, and the like.

In step S304, the controller 111 outputs information for switching vehicle control when there is an acceleration possibility. Specifically, the controller 111 outputs a digital value (0 is output when there is no acceleration possibility, and 1 is output when there is an acceleration possibility).

In step S305, the controller 111 detects the acceleration of the vehicle 100, and determines that the vehicle 100 is accelerating when the acceleration of the vehicle is positive.

In step S306, the controller 111 determines a deceleration possibility of the host vehicle 401 by using at least one of the surrounding road information acquisition unit 125 and the surrounding vehicle information acquisition unit 126.

Figure 5:
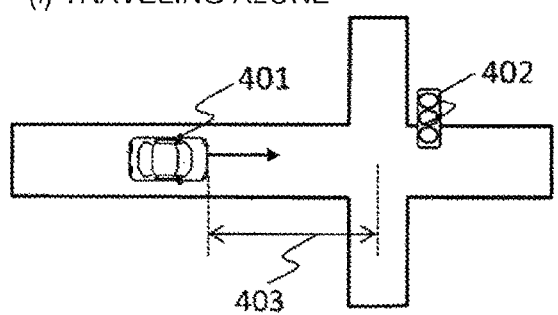
FIG. 5 is a running scene illustrating determination of a deceleration possibility according to the first embodiment of the present invention.
Figure 5:
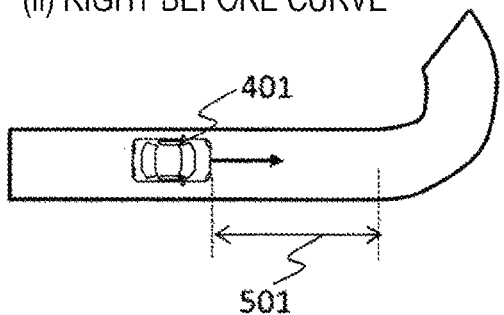
Figure 5:
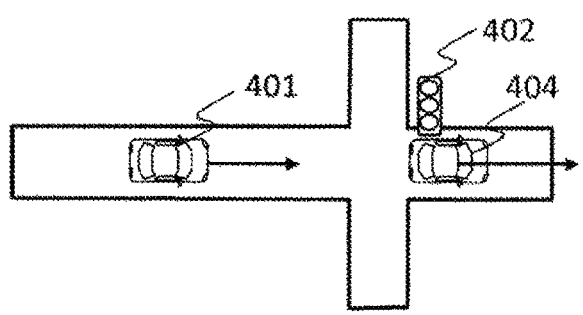
Figure 5:
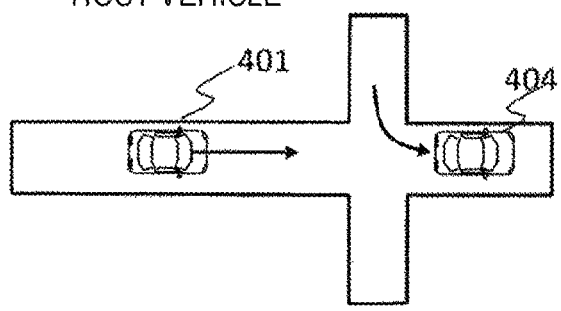
Figure 5:
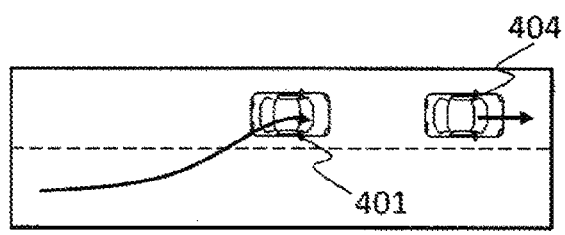
Figure 5:
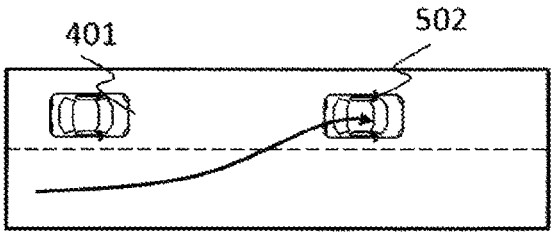

Specifically, as illustrated in FIG. 5, at an intersection with a traffic signal, while the host vehicle 401 is traveling alone (i), the controller 111 determines a deceleration possibility of the host vehicle 401 according to the color of the traffic signal 402 and the distance 403 between the host vehicle 401 and the intersection. For example, when the traffic signal 402 is blue and the distance 403 between the host vehicle 401 and the intersection is equal to or more than a set value, the controller 111 determines that there is a deceleration possibility of the host vehicle 401. When the distance 403 between the host vehicle 401 and the intersection is equal to or less than the set value and the traffic signal 402 turns yellow or red, the controller 111 determines that there is a deceleration possibility of the host vehicle 401.

Furthermore, when the controller 111 acquires curve information before the host vehicle 401 enters a curve (ii), the controller 111 calculates an appropriate speed to round the curve, on the basis of curvature information. When the speed of the host vehicle 401 is larger than the appropriate speed and a distance 501 to the curve is equal to or less than a predetermined value, the controller 111 determines that there is a deceleration possibility of the host vehicle 401. Note that the controller 111 obtains the curvature information on the basis of information from the surrounding road information acquisition unit 125 or the surrounding vehicle information acquisition unit 126.

When the color of the traffic signal 402 is blue and the acceleration of the preceding vehicle is negative where the host vehicle 401 is following the preceding vehicle 404 (iii), the controller 111 determines that there is a deceleration possibility of the host vehicle 401. Furthermore, when the preceding vehicle turns right or left and merges in front of the host vehicle traveling on a road (iv), the controller 111 determines that there is a deceleration possibility of the host vehicle 401. It should be noted that the controller 111 determines that the preceding vehicle merges into the road on which the host vehicle travels, on the basis of information from the surrounding road information acquisition unit 125 or the surrounding vehicle information acquisition unit 126.

Furthermore, when the controller 111 detects a request for lane change (v) of the host vehicle 401, the preceding vehicle 404 is at a destination of lane change, and a speed of the preceding vehicle 404 is smaller than the speed of the host vehicle 401, it is determined that there is a deceleration possibility. Here, in a method for detecting a lane change request, the controller 111 determines whether there is a blinker signal from the host vehicle 401 or when there is a blinker signal or when a steering operation amount is equal to or more than a predetermined value, it is determined that lane change is to be performed.

Furthermore, when the controller 111 detects a status in which a parallel running vehicle 502 is likely to cut in front of the host vehicle traveling on a road, the controller 111 determines that there is a deceleration possibility. The lane change possibility of the parallel running vehicle 502 detects blinker information of the parallel running vehicle 502 or steering of the parallel running vehicle. When the speed of the parallel running vehicle 502 cutting in front of the host vehicle traveling on a road is smaller than the speed of the host vehicle, the controller 111 determines that there is a deceleration possibility.

In step S307, the controller 111 outputs information for switching processing when there is a deceleration possibility. Specifically, the controller 111 outputs a digital value (0 is output when there is no deceleration possibility, and 1 is output when there is a deceleration possibility).

Figure 6:
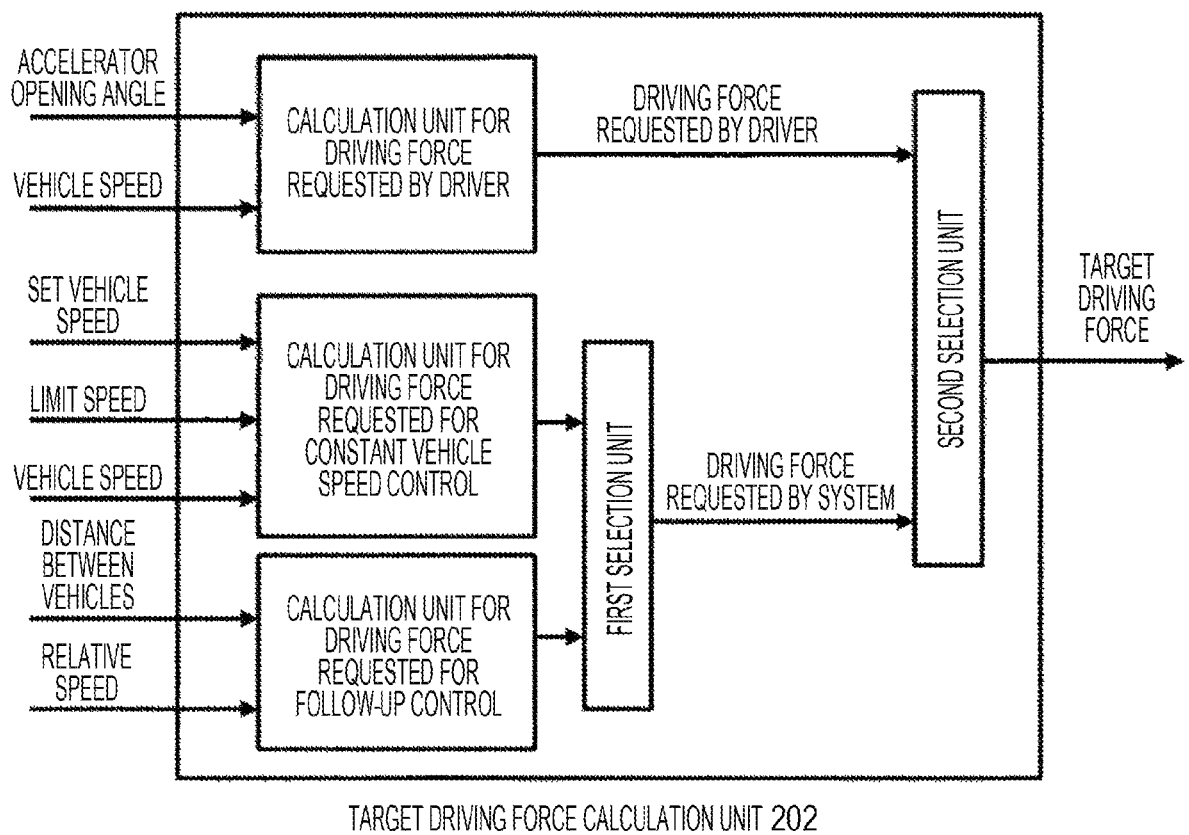
FIG. 6 is a block diagram illustrating calculation of a target driving force according to the first embodiment of the present invention.

As illustrated in FIG. 6, the controller 111 includes a target driving force calculation unit 202 in which a calculation unit for driving force requested by the driver calculates a driving force requested by the driver according to vehicle speed and accelerator opening angle calculated by the accelerator pedal position detection unit 112. In addition, a calculation unit for driving force requested for constant vehicle speed control calculates a driving force requested for constant vehicle speed control, on the basis of set vehicle speed, limit speed, and current vehicle speed. Furthermore, a calculation unit for driving force requested for follow-up control calculates a driving force requested for follow-up control, on the basis of distance to a preceding vehicle and relative speed, and a first selection unit calculates a driving force requested by the system by using the driving force requested for constant vehicle speed control and the driving force requested for follow-up control. Finally, a second selection unit compares the driving force requested by the driver and the driving force requested by the system to calculate a target driving force.

Figure 7:
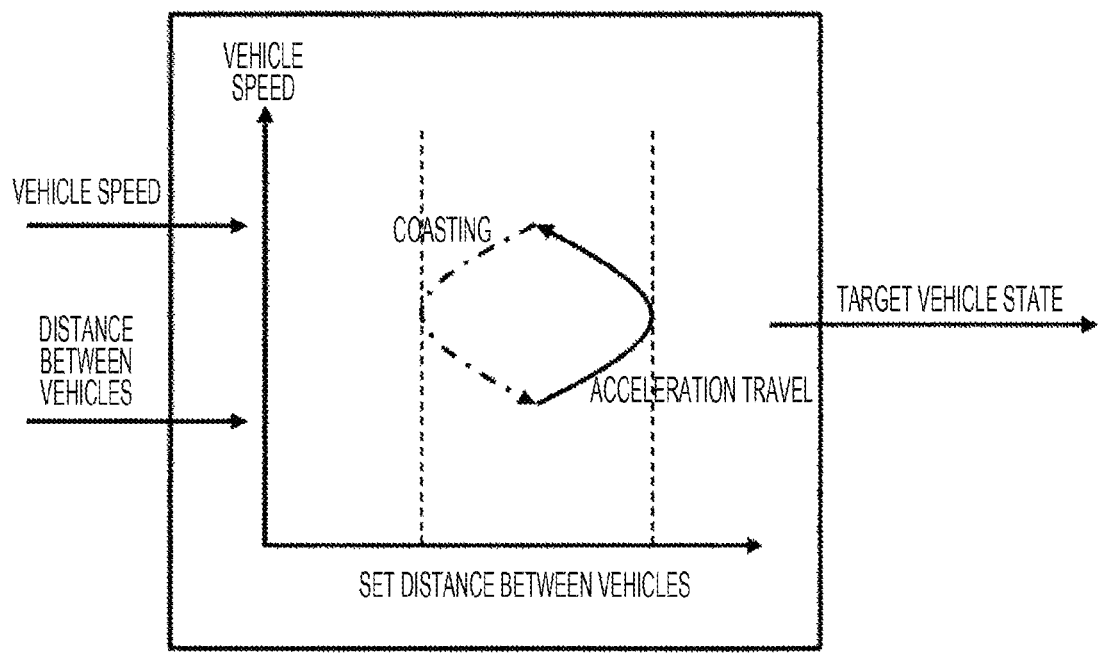
FIG. 7 is a block diagram illustrating calculation of a target vehicle state according to the first embodiment of the present invention.

As illustrated in FIG. 7, a target vehicle state calculation unit 203 controls the host vehicle 401 to perform acceleration travel or coasting as a target vehicle state, on the basis of vehicle speed and inter-vehicle distance. Specifically, acceleration travel or coasting is controlled to be within a preset inter-vehicle distance range. Here, the set inter-vehicle distance range may use headway time changed according to vehicle speed Furthermore, the set inter-vehicle distance range may be changed by driver's operation. Furthermore, the set inter-vehicle distance range may be inter-vehicle distance specific to the driver learned on the basis of driver's operation.

When the engine 101 is in a stoppable state, the controller 111 releases the clutch mechanism 119 and causes the vehicle 100 to travel while fuel supply to the engine 101 is stopped, in coasting (hereinafter referred to as engine stop coasting). Furthermore, when the engine 101 is in an unstoppable state, the controller 111 causes the vehicle to travel while only the clutch mechanism 119 is released, in coasting (hereinafter referred to as engine idling coasting). Still furthermore, when strong deceleration is required as compared with when the clutch mechanism 119 is released, the controller 111 selects a method for decelerating by increasing braking force with an electric brake or a method for decelerating by causing an engine braking state, and acceleration travel or coasting is controlled to be within the inter-vehicle distance range.

Figure 8:
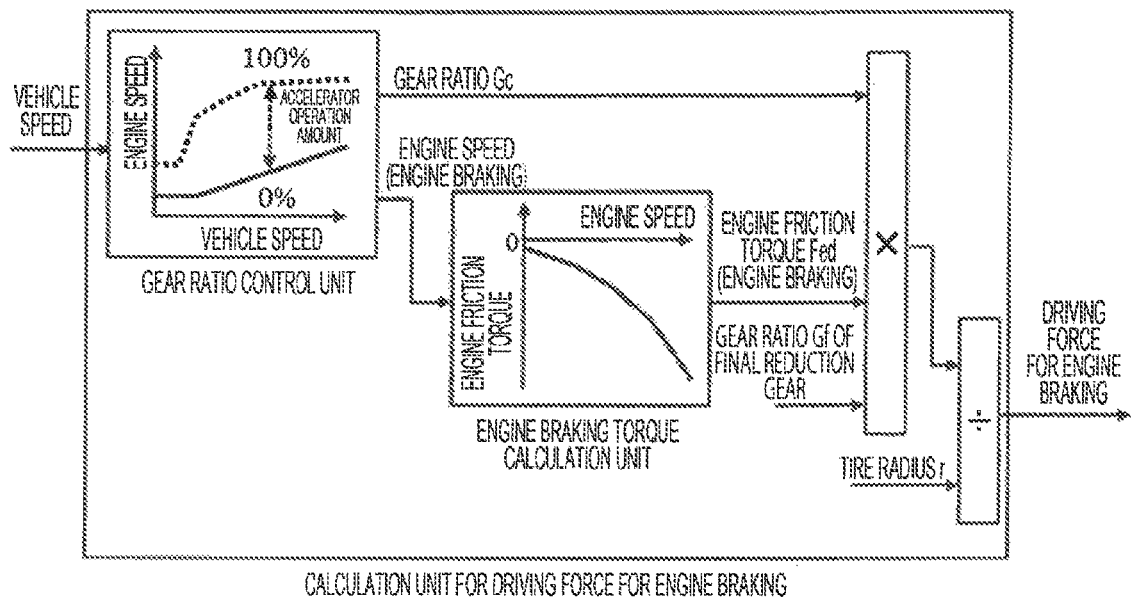
FIG. 8 is a block diagram illustrating calculation of an engine braking force according to the first embodiment of the present invention.
Figure 9:
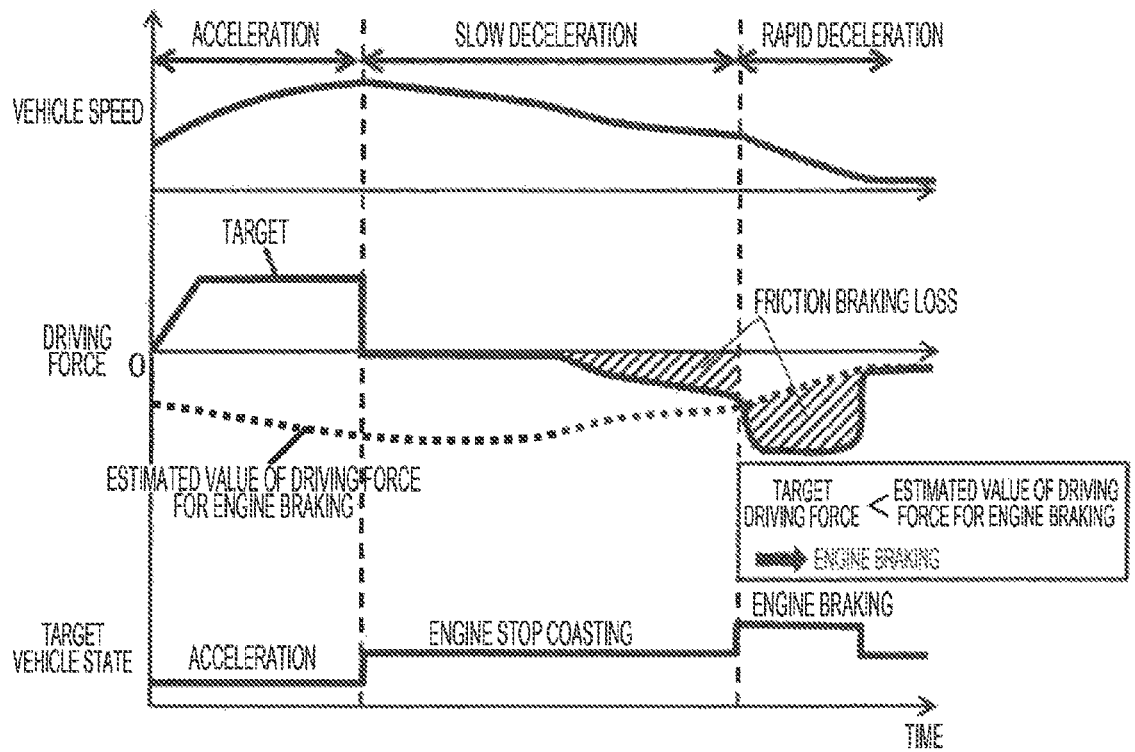
FIG. 9 is a time chart of controlling a target vehicle state according to the first embodiment of the present invention.

A method for controlling the target vehicle state on the basis of the target driving force will be described. Firstly, as illustrated in FIG. 8, the controller 111 includes a calculation unit for driving force for engine braking in which a driving force during engine braking is calculated. A gear ratio control unit outputs a gear ratio $G_c$ and engine speed. Engine braking has different engine speeds according to vehicle speed. Specifically, a target engine speed is an engine speed obtained when an accelerator operation amount is 0% in gear ratio control. In an engine braking torque calculation unit, this target value is output as an engine speed during engine braking. Next, a relationship between engine speed and engine friction upon fuel cut is calculated beforehand, and by inputting the engine speed during engine braking, the engine braking torque calculation unit calculates an engine friction torque $F_{ed}$ during engine braking and outputs the engine friction torque $F_{ed}$. In the calculation unit for driving force for engine braking, the engine friction torque $F_{ed}$ during engine braking takes the product of the gear ratio $G_c$ and a gear ratio $G_f$ of a final reduction gear, and is divided by a tire radius r. Then the driving force during engine braking which is applied onto a tire is calculated and output. FIG. 9 illustrates a relationship between the target driving force and the target vehicle state in acceleration, slow deceleration, and rapid deceleration of vehicle speed. Here, a state in which acceleration is changed to slow deceleration and further to rapid deceleration will be described. In driving force, the bold line represents the target driving force, while the dotted line represents estimated values when engine braking is applied. In the present embodiment, each estimated value of driving force for engine braking obtained when engine braking is applied at current vehicle speed is calculated. When the target driving force is larger than an estimated value of driving force for engine braking, comparing the estimated value of driving force for engine braking with the target driving force in a section of slow deceleration, that is, in FIG. 9, when the dotted line representing the estimated values of driving force for engine braking is below the bold line representing the target driving force, application of engine braking provides excessive engine braking force, giving the driver a sense of deceleration more than necessary.

Since the estimated value of driving force for engine braking is less than 0 in FIG. 9, and can be referred to as negative driving force. The farther the estimated value of driving force for engine braking is away from 0, the larger engine braking force is. Therefore, in such a case, as illustrated in FIG. 9, an automatic electric braking system is controlled without applying engine braking, and deceleration is achieved only by friction brakes of the automatic electric braking system. In FIG. 9, a hatched area represents a braking force applied by a friction brake of the automatic electric braking system and represents a negative driving force.

Then, when the target driving force becomes smaller than the estimated values of driving force for engine braking in a section of rapid deceleration, that is, when the dotted line representing the estimated values of driving force for engine braking shifts above from below the bold line representing the target driving force in FIG. 9, the target vehicle state is switched to engine braking. That is, engine braking is applied to control the braking force applied to the vehicle. Furthermore, the braking force is not enough for braking force of engine braking, that is, the negative driving force is not enough. Therefore, by controlling the automatic electric braking system in addition to the engine braking, vehicle speed is controlled to reach the target driving force represented by the bold line. In this way, use of engine braking in rapid deceleration enables application of braking force (negative driving force) of the friction brake of the automatic electric braking system only in the hatched area. Thus, a burden on the friction brake is reduced and the life of a brake pad or the like is extended. The controller 111 of FIG. 2 includes a target engine output calculation unit 204 which calculates a target engine output Pt_e on the basis of a target driving force Ft and a vehicle speed V by using formula (1).

$$P_{t\_e} = (F_t + C_d S V^2 + \mu M g \cos \theta + M g \sin \theta) \times V \quad (1)$$

Here, M is a vehicle weight, $C_d$ is an air resistance coefficient, S is a frontal projected area of the vehicle, V is a vehicle speed, p is a rolling resistance coefficient, g is gravitational acceleration, and θ is road gradient. That is, an air resistance force $C_d S V^2$, a kinetic friction force μMg cos θ, and a force Mg sin θ of sliding down a slope act on the target driving force $F_t$, and the target engine output Pt_e is expressed by formula (1) described above. In FIG. 9, when the target vehicle state is to be accelerated, the target engine output calculation unit 204 outputs the target engine output Pt_e calculated according to formula (1).

On the other hand, when the target vehicle state is to coast, the target engine output calculation unit 204 outputs an engine output necessary for idling the engine.

Figure 2:
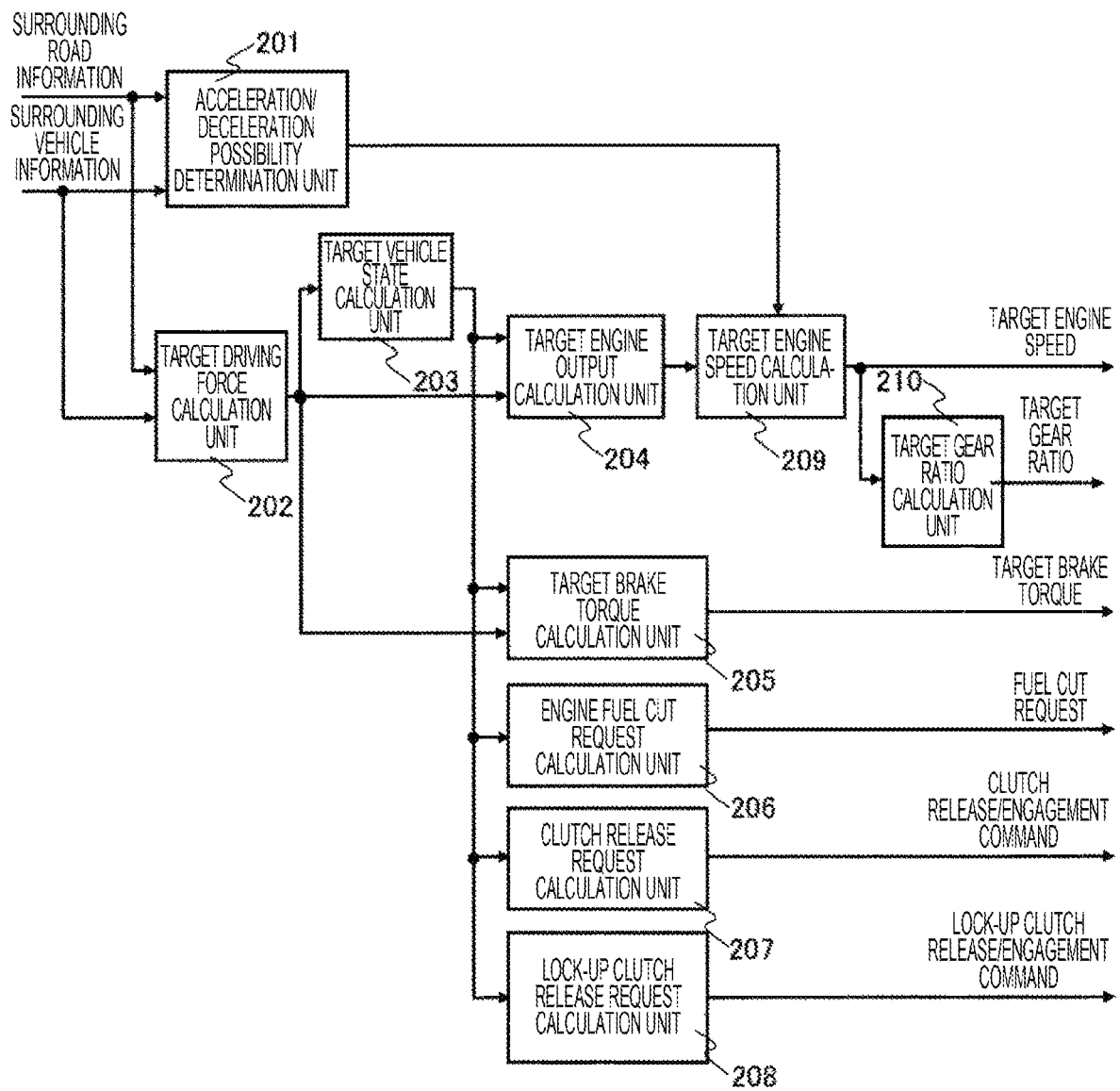
FIG. 2 is a control block diagram according to the first embodiment of the present invention.
Figure 3:
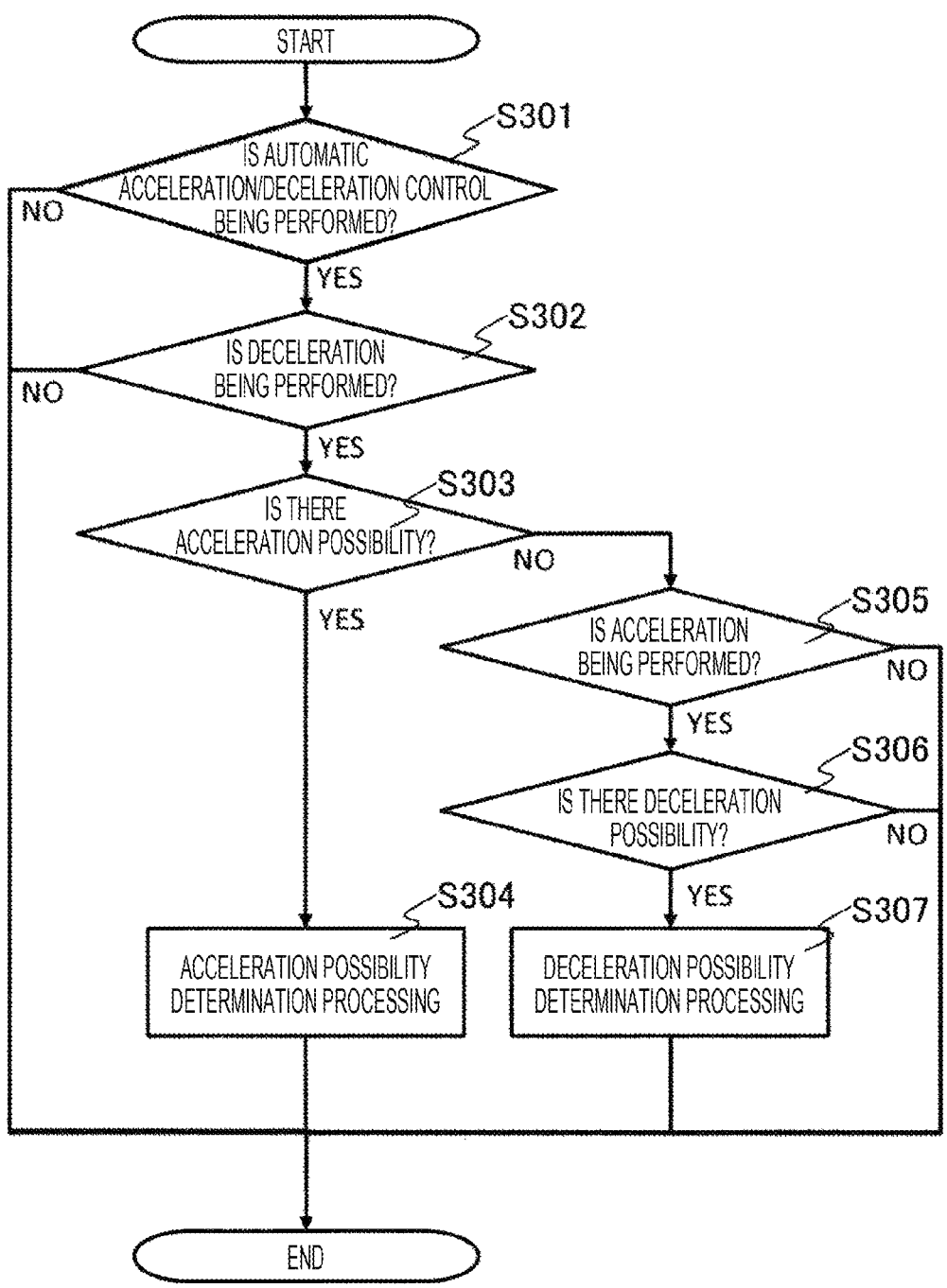
FIG. 3 is a control flowchart of an acceleration/deceleration possibility determination unit according to the first embodiment of the present invention.

When the target vehicle state calculation unit 203 outputs an engine stop coasting state or an engine braking state illustrated in FIG. 9, an engine fuel cut calculation unit 206 illustrated in FIG. 2 outputs a signal to cause the engine 101 to cut fuel. When the target vehicle state calculation unit 203 outputs an engine idling coasting state, not illustrated in FIG. 9, or the engine stop coasting state, a clutch release request calculation unit 207 outputs a signal to release the clutch mechanism 119 and outputs a signal to engage the clutch mechanism 119 in other cases. When the target vehicle state calculation unit 203 outputs that the target vehicle state is in the engine idling coasting state, not illustrated in FIG. 9, or in the engine stop coasting state, a lock-up clutch release request calculation unit 208 outputs a signal to release the lock-up clutch and gives instructions for engagement of the lock-up clutch in other cases. Here, a load applied to the wheels is different between when the clutch is released and when engine braking is applied, in engine stop coasting. Hence, a target brake torque calculation unit 205 calculates a target braking force Fb[N] on the basis of a powertrain state, as expressed in formula (2).

$$F_b = F_t + (F_{ed} \times G_c \times G_f / r) - (C_d S V^2 + \mu M g \cos \theta + M g \sin \theta)(\text{during engine braking}) \quad (2\text{-}1)$$

$$F_t - (C_d S V^2 + \mu M g \cos \theta + M g \sin \theta)(\text{during inertia running}) \quad (2\text{-}2)$$

Figure 10:
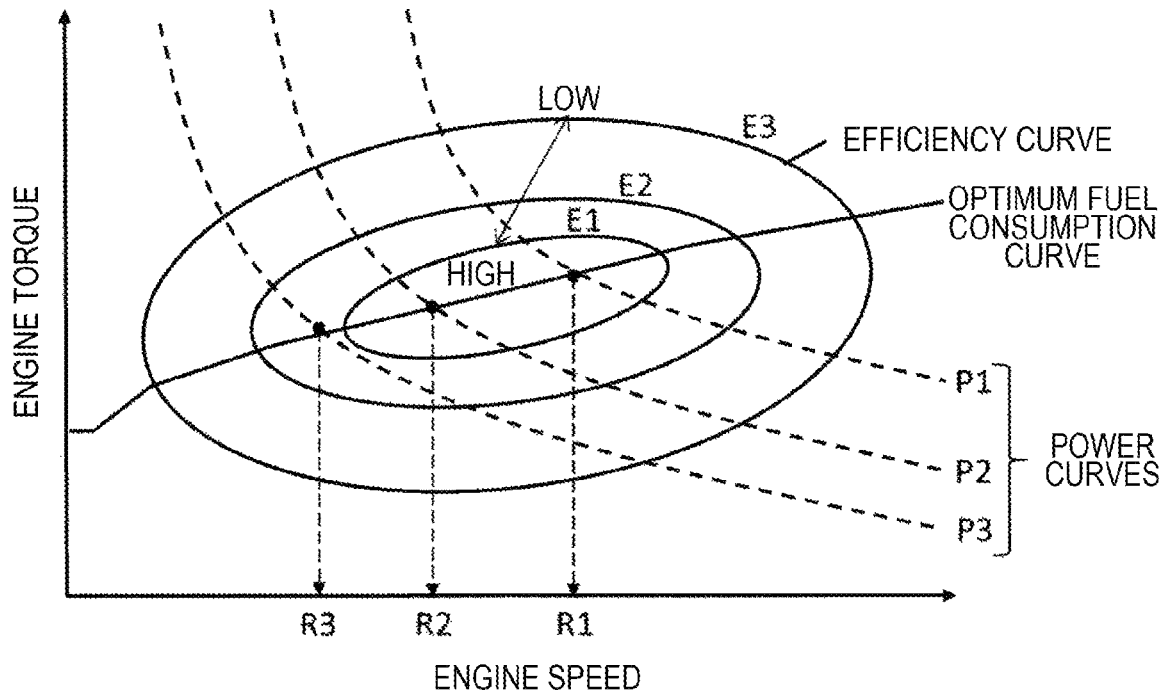
FIG. 10 is a diagram illustrating a relationship between engine efficiency and engine speed according to the first embodiment of the present invention.

Here, $F_{ed}$ [Nm] represents the friction torque of the engine when engine fuel is cut, $G_c$ is a gear ratio of transmission, $G_f$ is a gear ratio of the final reduction gear, and r is a tire radius. During engine braking, the engine is in a fuel cut state, and the torque converter 116 is in a lock-up state. Therefore, the load applied to the wheels during engine braking is calculated as the product of the friction torque $F_{ed}$ of the engine, the gear ratio $G_c$ of a CVT, and the gear ratio $G_f$ of the final reduction gear. A target engine speed calculation unit 209 in FIG. 2 will be described with reference to FIGS. 10 and 11. FIG. 10 illustrates efficiency curves (solid line) of the engine and constant output curves (broken line) where engine speed is plotted on the horizontal axis and engine torque is on the vertical axis. In the engine efficiency is the highest at the center of the ellipse, in general, as indicated by the engine efficiency curves (E1, E2, and E3), and the efficiency lowers as going away from the center. Furthermore, the optimum fuel consumption curve is expressed by connecting the points with the highest efficiency in the equal output curves (P1, P2, and P3) of the engine. Therefore, for efficient operation, it is necessary to control a certain engine speed (R1, R2, and R3) to a certain target engine output (P1, P2, and P3).

Figure 11:
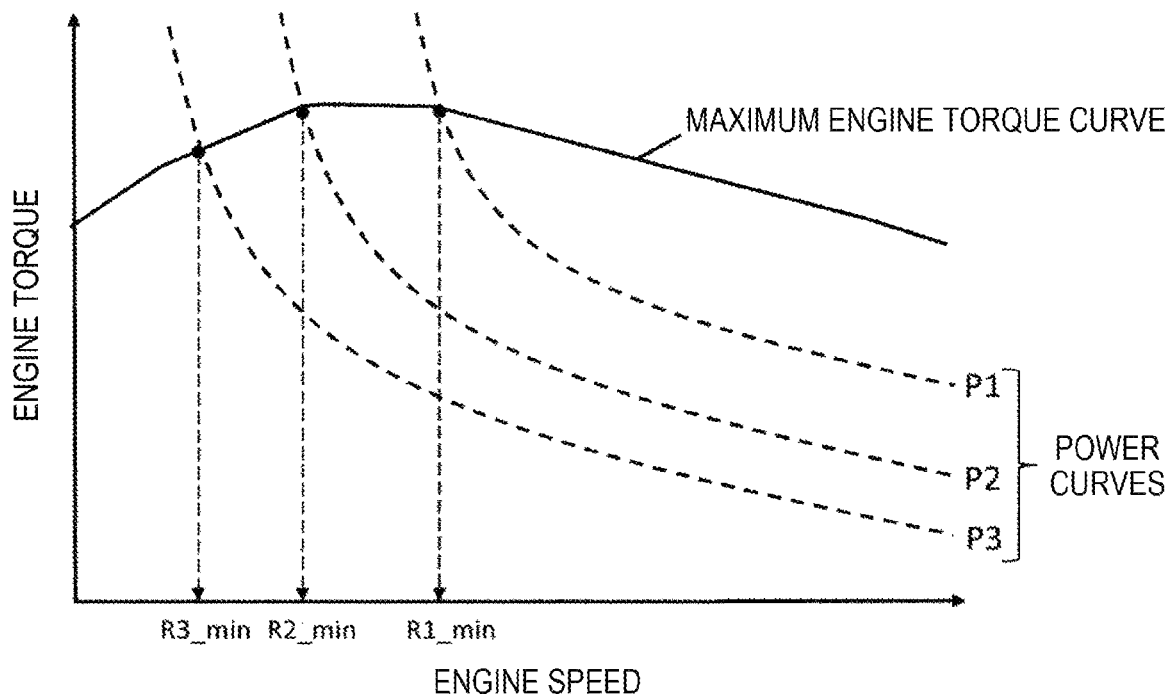
FIG. 11 is a diagram illustrating a relationship between maximum engine torque and engine speed according to the first embodiment of the present invention.
Figure 12:
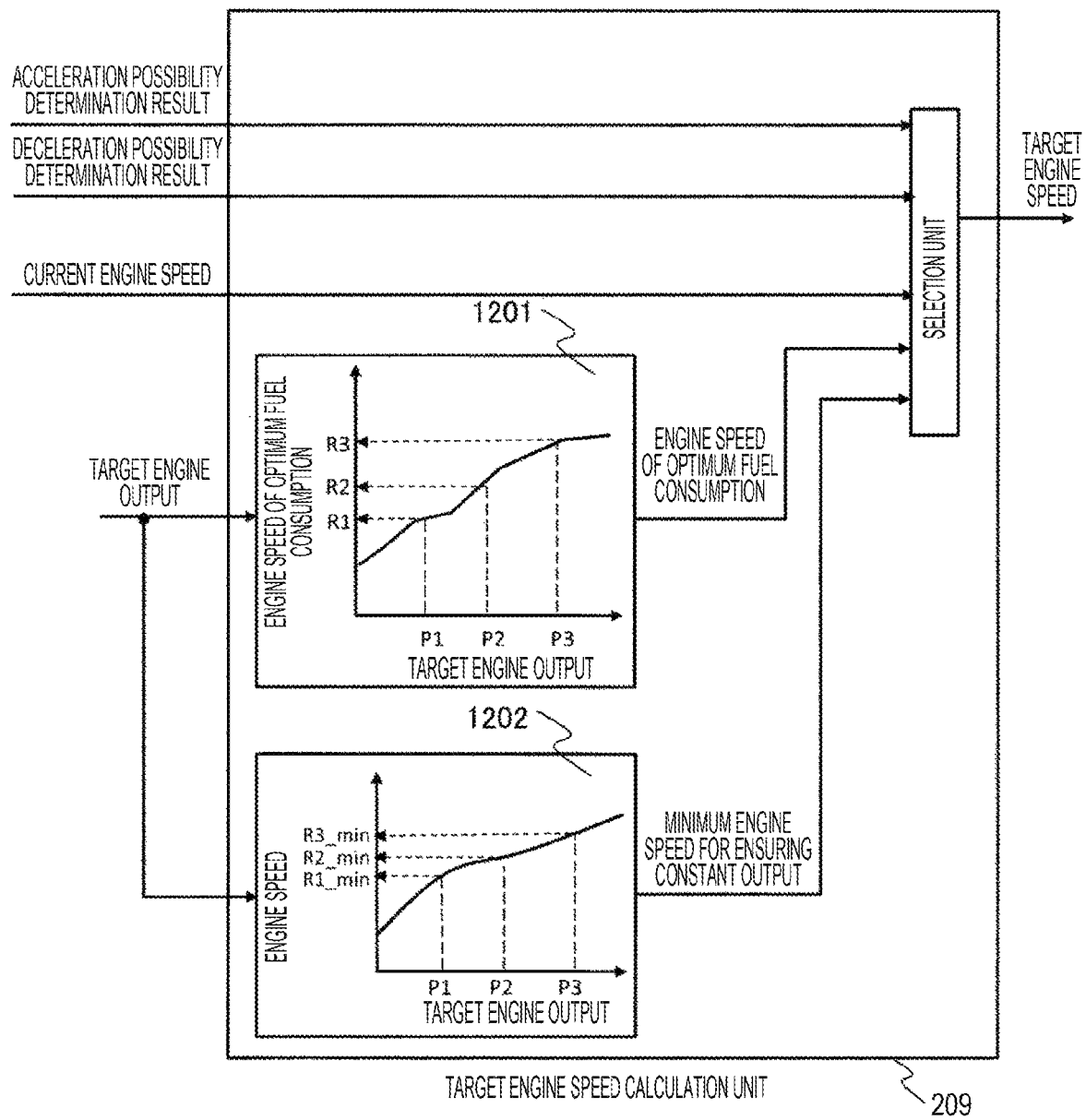
FIG. 12 is a block diagram illustrating calculation of target engine speed according to the first embodiment of the present invention.

Next, as illustrated in FIG. 11, the engine has a maximum engine torque (maximum engine torque curve) output according to the engine speed. In the present embodiment, for a certain target engine output (P1, P2, and P3), the lowest engine speed (R1_min, R2_min, and R3_min) achieving the target engine output is calculated and stored in a storage unit. Here, the engine is controlled to have a rotation speed not less than the calculated engine speed, enabling ensuring constant output and ensuring acceleration performance. FIG. 12 illustrates a method for calculating a target engine speed by the target engine speed calculation unit 209. In FIG. 12, reference numeral 1201 is a graph illustrating a relationship between target engine output and target engine speed of optimum fuel consumption, and this relational expression 1201 is determined on the basis of FIG. 10. In addition, in FIG. 12, reference numeral 1202 is a graph illustrating a relationship between target engine output and minimum engine speed ensuring constant output of the target engine output, and the relational expression 1202 is determined on the basis of FIG. 11.

The target engine speed calculation unit 209 includes a selection unit which selects a target engine speed (R1, R2, and R3) for target engine output, on the basis of the relational expression 1201 of the relational expression 1201 and the relational expression 1202, in a normal acceleration state. As a result, it is possible to drive the engine with optimum fuel consumption. Here, a current engine speed, an acceleration possibility determination result, and a deceleration possibility determination result are input to the selection unit of the target engine speed calculation unit 209.

Figure 13:
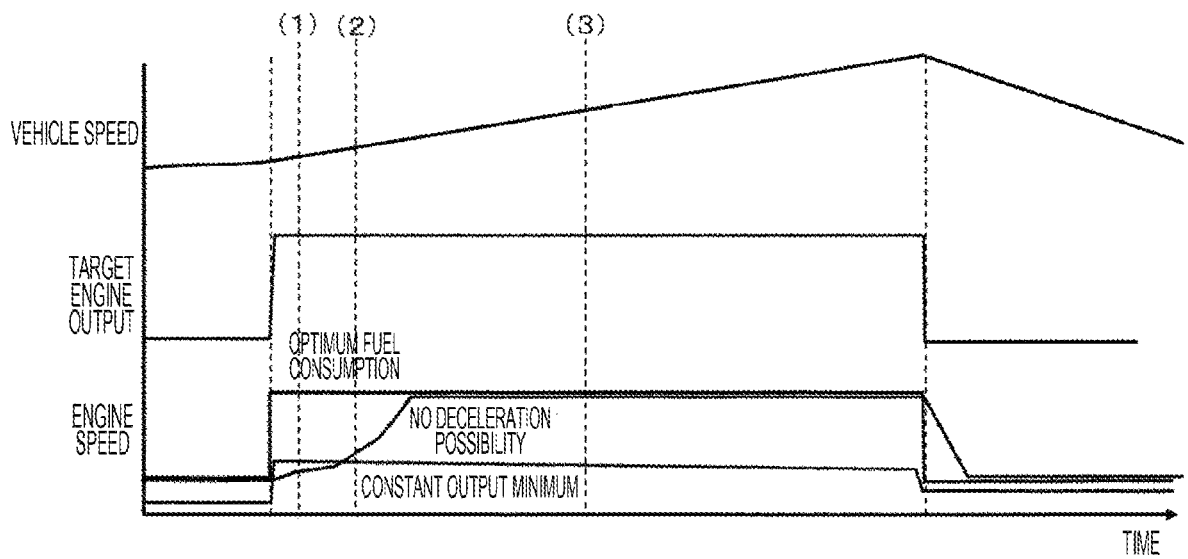
FIG. 13 is a time chart in determining deceleration possibility according to the first embodiment of the present invention.

As illustrated in FIG. 13, in acceleration, when deceleration possibility determination is input at time (1), the target engine speed calculation unit 209 sets the target engine speed to the minimum engine speed ensuring constant output of target engine speed, on the basis of the relational expression 1202, and controls the engine speed. That is, in normal acceleration, when there is a deceleration possibility, if the target engine speed (R1, R2, R3) is selected for the target engine output on the basis of the relational expression 1201, deceleration may be immediately required. This may cause the driver to feel uncomfortable, and there is a risk of lowering the drivability.

Therefore, in the present embodiment, in acceleration, when there is a subsequent deceleration possibility, the selection unit of the target engine speed calculation unit 209 selects a target engine speed on the basis of the relational expression 1202. More specifically, suppose that there is a deceleration possibility as described later, for example, when the engine output needs to be increased from P2 to P3. With the use of the relational expression 1201, the target engine speed to be selected is R3. However, in the present embodiment, the selection unit selects R3_min as the target engine speed, in such a case. As a result, since the engine output is increased from P2 to P3, acceleration performance can be maintained, but the engine speed is suppressed to R3_min which is smaller than R3. That is, even when there is subsequent deceleration, the engine speed is R3_min and gives less discomfort to the driver compared with a case in which engine speed is reduced from R3.

When deceleration possibility determination is input at time (2), that is, at time when the engine speed has already exceeded the minimum engine speed for ensuring the constant output, the target engine speed calculation unit 209 controls the engine speed at a current target rotation speed.

In other words, since the engine speed is controlled while maintaining the target rotation speed, shown as no deceleration possibility, it is possible to suppress an unnatural change in engine speed.

When deceleration possibility determination is input at time (3), that is, at time when the rotation speed already reaches engine speed of optimum fuel consumption, the selection unit outputs target rotation speed of optimum fuel consumption on the basis of the relational expression 1201, and controls the engine speed on the basis of the target rotation speed.

Engine characteristics such as the relational expression 1201 and the relational expression 1202 are different according to the type of engine. Therefore, the above-described relational expression 1201 and relational expression 1202 are calculated and then stored in the storage unit.

Figure 14:
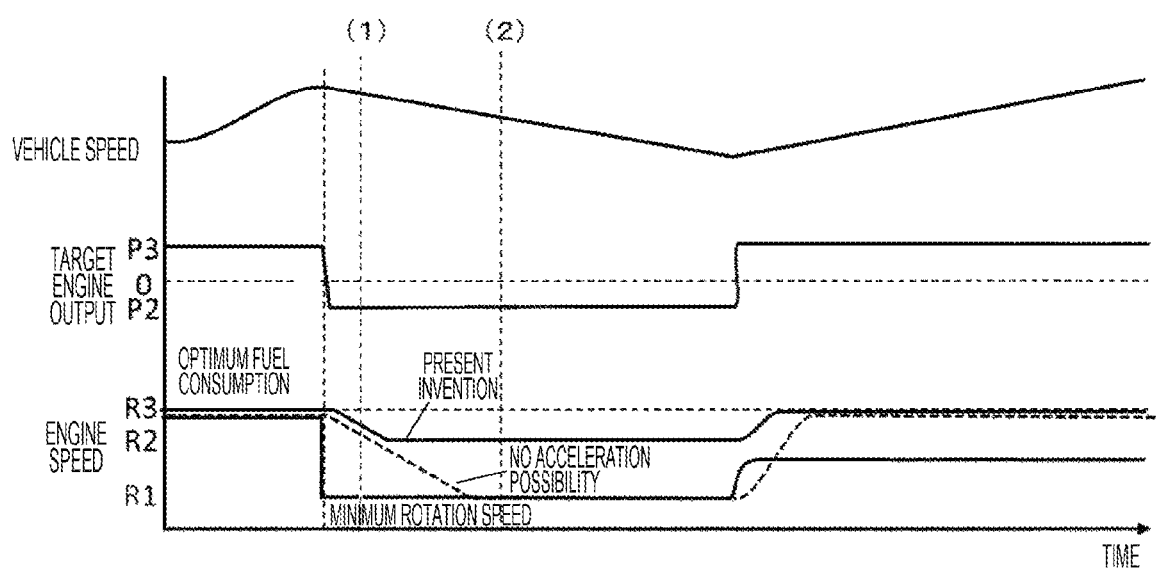
FIG. 14 is a time chart in determining acceleration possibility according to the first embodiment of the present invention.
Figure 15:
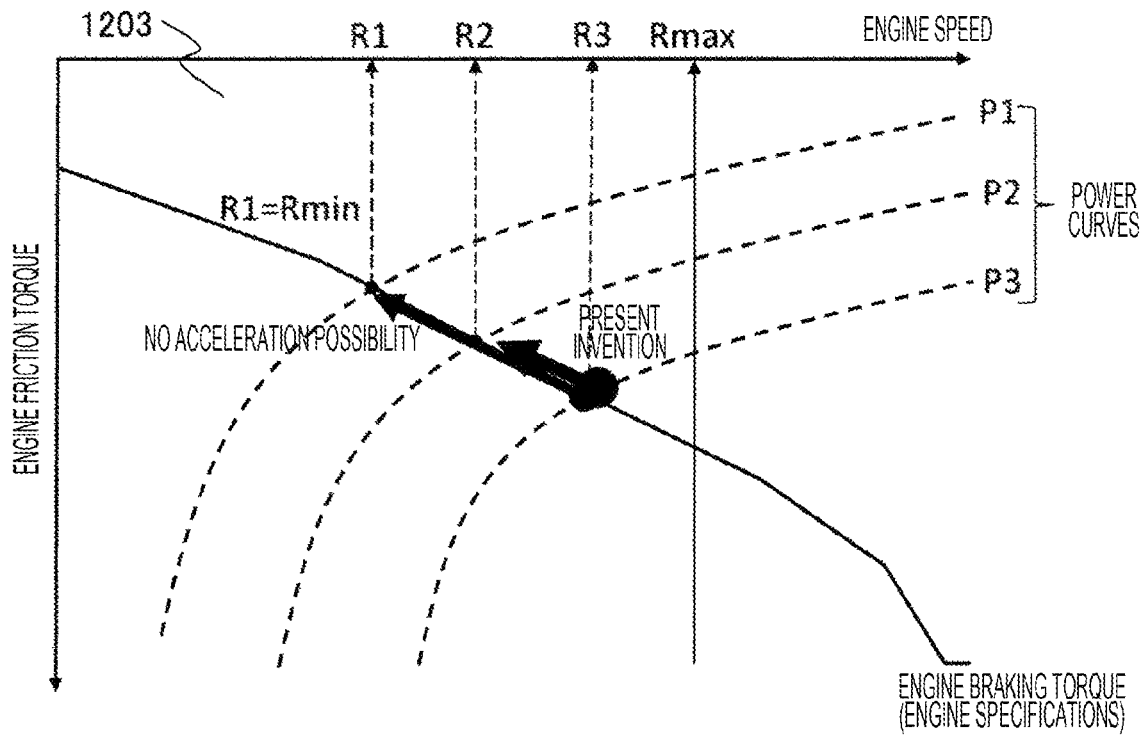
FIG. 15 is a diagram illustrating a relationship between engine friction torque and engine speed according to the first embodiment of the present invention.

As illustrated in FIG. 14, in deceleration, when deceleration possibility determination is input at time (1), the target engine speed calculation unit 209 controls the target engine speed on the basis of a relational expression 1203 illustrated in FIG. 15. In FIG. 15, the horizontal axis shows engine speed, and the vertical axis shows engine friction torque, and the lower side of the vertical axis shows larger engine friction torque. The relational expression 1203 is not illustrated in the target engine speed calculation unit 209, but corresponds to the relational expression 1202 described above, and this relational expression 1203 is input to the selection unit.

In normal deceleration, when there is an acceleration possibility, if the target engine speed R1 which is _Rmin is selected for the target engine output on the basis of an arrow of the relational expression 1203 representing no acceleration possibility, acceleration may be immediately required. This may cause the driver to feel uncomfortable, and there is a risk of lowering the drivability.

Therefore, in the present embodiment, it is assumed that there is an acceleration possibility at time (1) of FIG. 14, in deceleration. At time (1), the engine speed is being reduced to the minimum R1 during coasting. In this case, the selection unit of the target engine speed calculation unit 209 selects a target engine speed on the basis of the relational expression 1203. For example, when engine braking is applied for deceleration at engine output P3 without any acceleration possibility, the engine speed is lowered to R1 which is the minimum. However, in the present embodiment, the selection unit selects target engine speed R2 due to a subsequent acceleration possibility.

Engine braking is not enough as braking force to lower engine output to P1, and brakes are applied to compensate for insufficient braking force. As a result, even when there is subsequent acceleration, the engine speed is inhibited from rapidly increasing while maintaining a necessary braking force, and gives less discomfort to the driver compared with a case in which the engine speed is reduced to R1.

Figure 16:
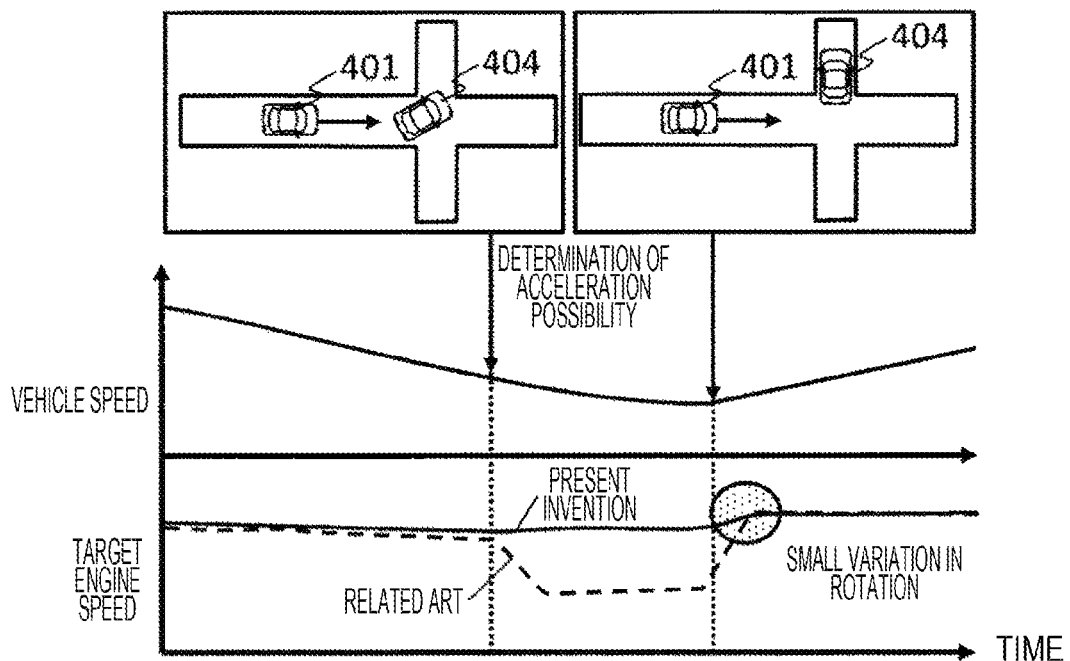
FIG. 16 is a time chart in determining acceleration possibility according to the first embodiment of the present invention.

When acceleration possibility determination is input at time (2), that is, at time when the engine speed has already decreased to the minimum R1, the target engine speed calculation unit 209 controls the engine speed at a current target rotation speed. In other words, since the engine speed is controlled while maintaining the target rotation speed (minimum rotation speed R1), shown as no acceleration possibility, it is possible to suppress an unnatural change in engine speed. FIG. 16 is a diagram illustrating a method for setting a target engine speed by the target engine speed calculation unit 209 when it is determined by the acceleration/deceleration possibility determination unit 201 that there is an acceleration possibility or that there is no acceleration possibility. As illustrated in FIG. 16, when a vehicle is following a preceding vehicle, and the acceleration/deceleration possibility determination unit 201 determines that there is no acceleration possibility of the host vehicle, on the basis of peripheral vehicle information from the surrounding vehicle information acquisition unit 126 and surrounding road information from the surrounding road information acquisition unit 125, the engine speed is controlled as in a conventional case.

Figure 17:
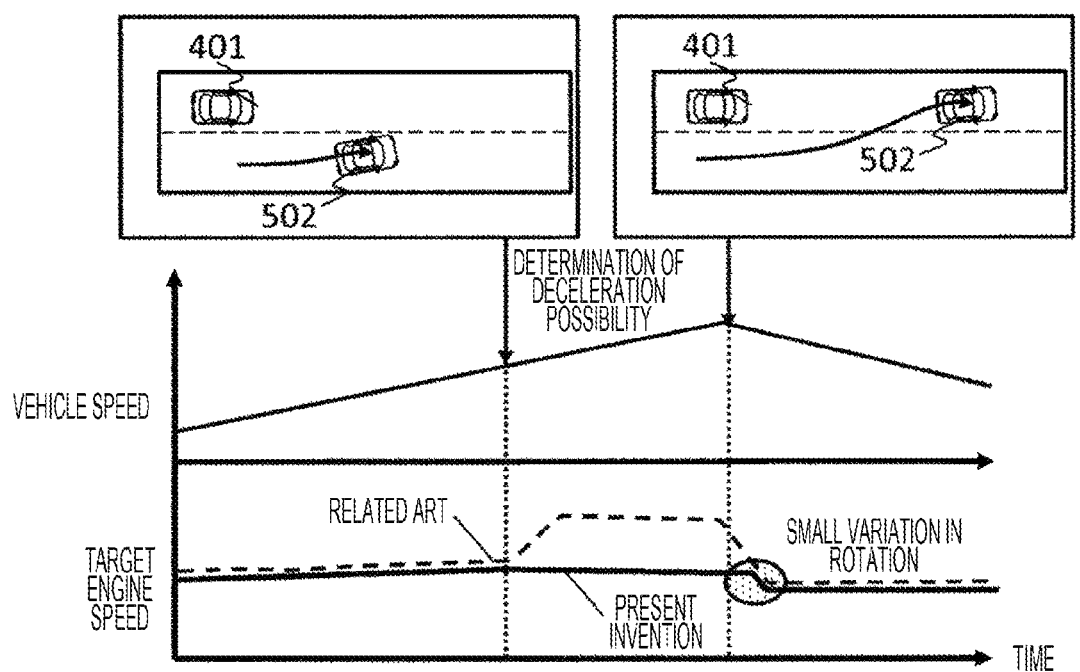
FIG. 17 is a time chart in determining deceleration possibility according to the first embodiment of the present invention.

For example, when the preceding vehicle 404 decelerates, the host vehicle 401 also needs to decelerate, and no engine driving force is required. When no engine driving force is required, fuel supply is stopped and an engine braking state is brought about. At this time, a target engine speed has a gear ratio corresponding to 0% accelerator operation amount indicated by the gear ratio control unit of FIG. 8, and is controlled to a rotation speed smaller than a rotation speed of optimum fuel consumption in acceleration. Next, when the preceding vehicle 404 turns left at an intersection and withdraws, the host vehicle 401 reaccelerates. At that time, the gear ratio is controlled to have a target engine speed of optimal fuel consumption. As a result, a variation in engine speed increases, and uncomfortable feeling arises due to the variation in engine speed. In contrast, in the present embodiment, when it is predicted that the preceding vehicle 404 should turn left and the host vehicle 401 would need to immediately reaccelerate, the engine speed of optimum fuel consumption is set to the target engine speed at that time. Thus, it is possible to achieve prompt acceleration at an engine speed of optimum fuel consumption in reacceleration while suppressing a variation in engine speed, and fuel consumption is improved. FIG. 17 illustrates a state in which a vehicle 502 traveling on a lane cuts in front of the host vehicle accelerating on another lane. When there is no acceleration possibility determination and there is no deceleration possibility, the speed ratio control is executed so that the target engine speed of optimum fuel consumption is achieved. When a lane change occurs during acceleration, it is necessary for the host vehicle to decelerate or reduce output, and no engine driving force is required. When no engine driving force is required, the target engine speed has a gear ratio corresponding to 0% accelerator operation amount indicated by the gear ratio control unit of FIG. 8, and is controlled to a rotation speed smaller than a rotation speed of optimum fuel consumption in acceleration, as described above. As a result, a variation in engine speed increases, and uncomfortable feeling arises due to the variation in engine speed. In contrast, in the present invention, when the lane change of the cut-in vehicle 502 and immediate deceleration required for the host vehicle 401 are predicted, a minimum engine speed ensuring necessary output during acceleration is set to the target engine speed on the basis of the relational expression 1202. Therefore, while the acceleration performance is ensured, a variation in engine speed is reduced when deceleration occurs, and the driving performance is improved.

Figure 18:
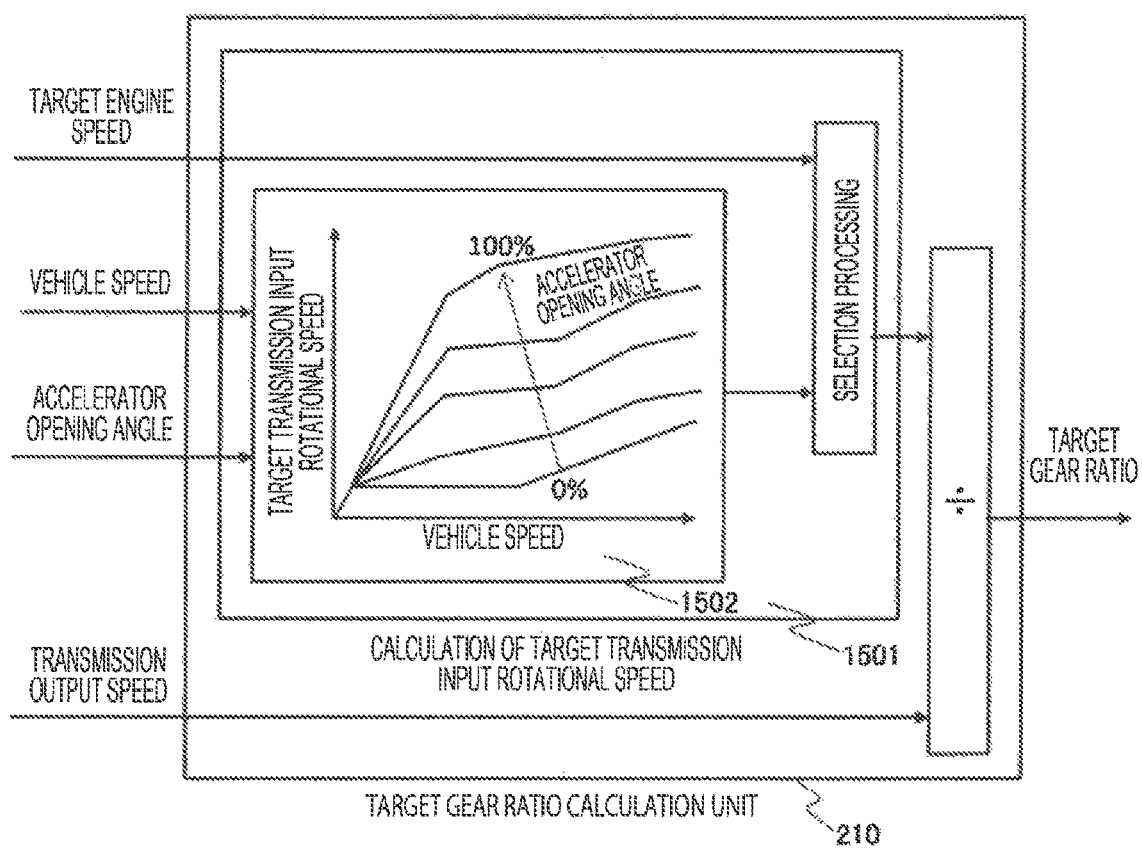
FIG. 18 is a block diagram illustrating calculation of target gear ratio according to the first embodiment of the present invention.

As illustrated in FIG. 18, in a target gear ratio calculation unit 210, target transmission input rotation speed is calculated in calculation 1501 of target transmission input rotation speed and is divided by transmission output rotation speed to calculate target gear ratio. In the calculation 1501 of target transmission input rotation speed, the results of a target transmission input rotation speed map 1502 according to target engine speed, accelerator opening angle, and vehicle speed are compared. The target transmission input rotation speed map 1502 is set so that the target transmission input rotation speed increases as the accelerator opening angle increases. An output result from target engine speed calculation unit 209 is compared with an output result from the target transmission input rotation speed map 1502, and a result having the larger rotation speed is output as the target transmission input rotation speed. As a result, when driver's accelerator operation is interposed, speed ratio is controlled as usual, and thereby discomfort in driving performance can be reduced.

As described above with reference to FIGS. 13 and 17, the vehicle control unit (controller 111) according to the present embodiment includes a surrounding vehicle information acquisition unit 126 and an acceleration/deceleration possibility determination unit 201. The surrounding vehicle information acquisition unit 126 acquires surrounding information around a host vehicle. The acceleration/deceleration possibility determination unit 201 determines acceleration possibility or deceleration possibility of a host vehicle on the basis of surrounding information from the surrounding vehicle information acquisition unit. Furthermore, the vehicle control unit includes a target engine speed calculation unit 209 and an engine control unit. The target engine speed calculation unit 209 corrects a target engine speed to be reduced relative to a predetermined target engine speed when the acceleration/deceleration possibility determination unit 201 determines that there is a deceleration possibility during acceleration to a target vehicle speed in automatic acceleration/deceleration control. The engine control unit controls an engine 101 to have a target engine speed corrected by the target engine speed calculation unit 209.

In other words, the vehicle control unit (the controller 111) has a first acceleration mode and a second acceleration mode with an acceleration level lower than that of the first acceleration mode, and the target engine speed calculation unit 209 includes a selection unit which selects the first or second acceleration mode on the basis of a deceleration possibility during acceleration.

Alternatively, it may be said that the target engine speed calculation unit 209 corrects a target engine speed to have an acceleration level lower than a predetermined acceleration level on the basis of a deceleration possibility during acceleration.

Furthermore, in a case where engine output already reaches target output when the acceleration/deceleration possibility determination unit 201 determines that there is a deceleration possibility, the engine control unit controls an engine to have a target engine speed before correction.

The acceleration/deceleration possibility determination unit 201 determines a deceleration possibility during acceleration on the basis of a distance to an intersection, traffic signal information, acceleration of a preceding vehicle, steering angle operation amount of a host vehicle, blinker operation of a host vehicle, distance to a curve, curvature of a curve, or position or speed information of a parallel running vehicle. Furthermore, the target engine speed calculation unit 209 corrects target engine speed to be not less than a minimum engine speed enabling target output to be output in acceleration. Furthermore, in a case where engine output already reaches target output when the acceleration/deceleration possibility determination unit 201 determines that there is a deceleration possibility, the engine control unit controls an engine 101 to have a target engine speed in the vicinity of optimum fuel consumption in engine characteristics.

As described with reference to FIGS. 14 and 16, the vehicle control unit (controller 111) according to the present embodiment includes a target engine speed calculation unit 209 and an engine control unit. The target engine speed calculation unit 209 corrects a target engine speed to be increased relative to a predetermined target engine speed when the acceleration/deceleration possibility determination unit 201 determines that there is an acceleration possibility during deceleration to a target vehicle speed in automatic acceleration/deceleration control. The engine control unit controls an engine 101 to have a target engine speed corrected by the target engine speed calculation unit 209.

Furthermore, the vehicle control unit (controller 111) has a first deceleration mode and a second deceleration mode with a deceleration level lower than that of the first deceleration mode, and the target engine speed calculation unit 209 includes a selection unit which selects the first or second deceleration mode on the basis of an acceleration possibility during deceleration.

It may be said that the target engine speed calculation unit 209 corrects a target engine speed to have a deceleration level higher than a predetermined deceleration level on the basis of an acceleration possibility during deceleration. Furthermore, the acceleration/deceleration possibility determination unit 201 determines an acceleration possibility during deceleration on the basis of a distance to an intersection, traffic signal information, acceleration of a preceding vehicle, steering angle operation amount of a host vehicle, blinker operation of a host vehicle, or road width.

Second Embodiment

Figure 19:
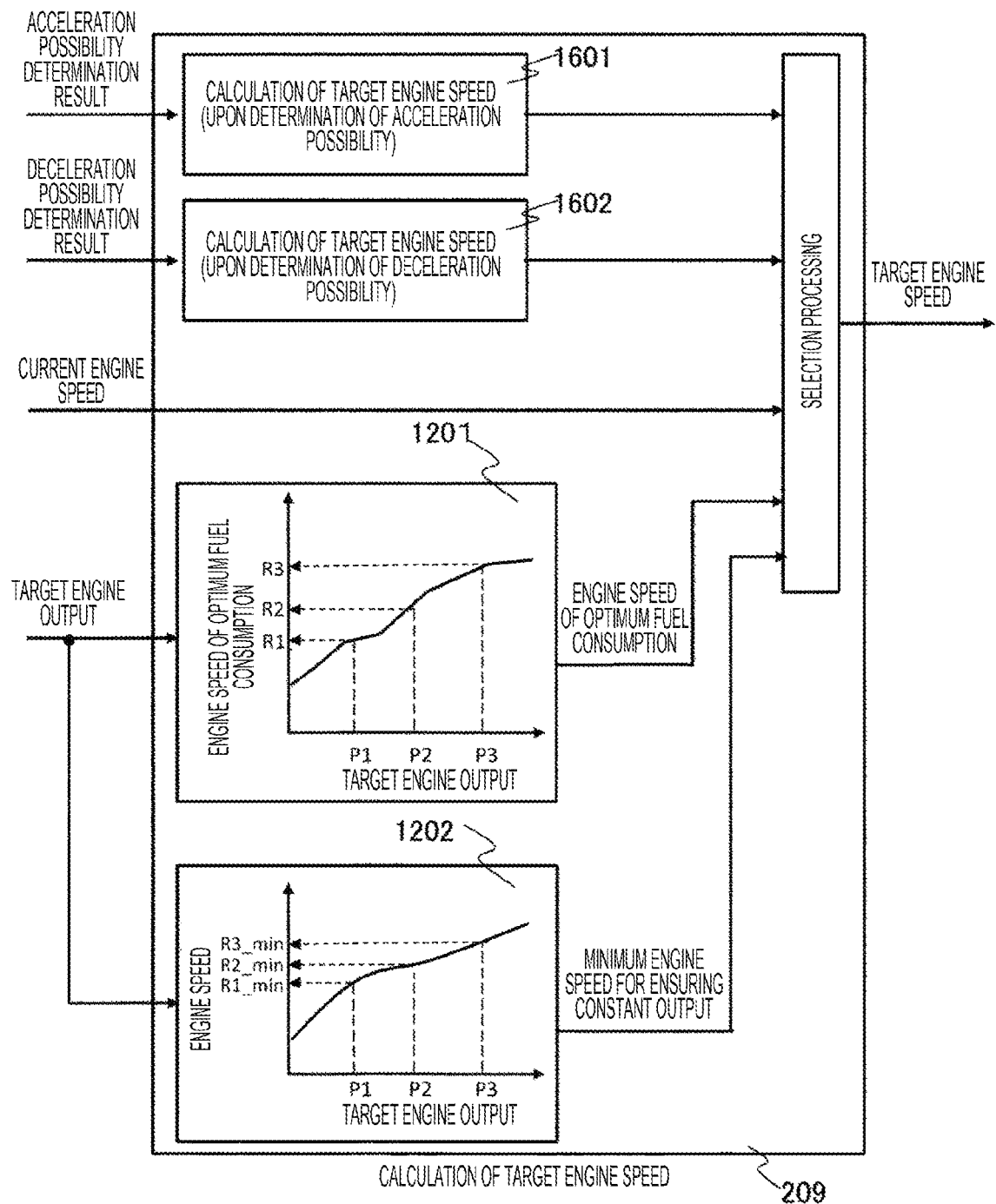
FIG. 19 is a block diagram illustrating calculation of target engine speed according to a second embodiment of the present invention.
Figure 20:
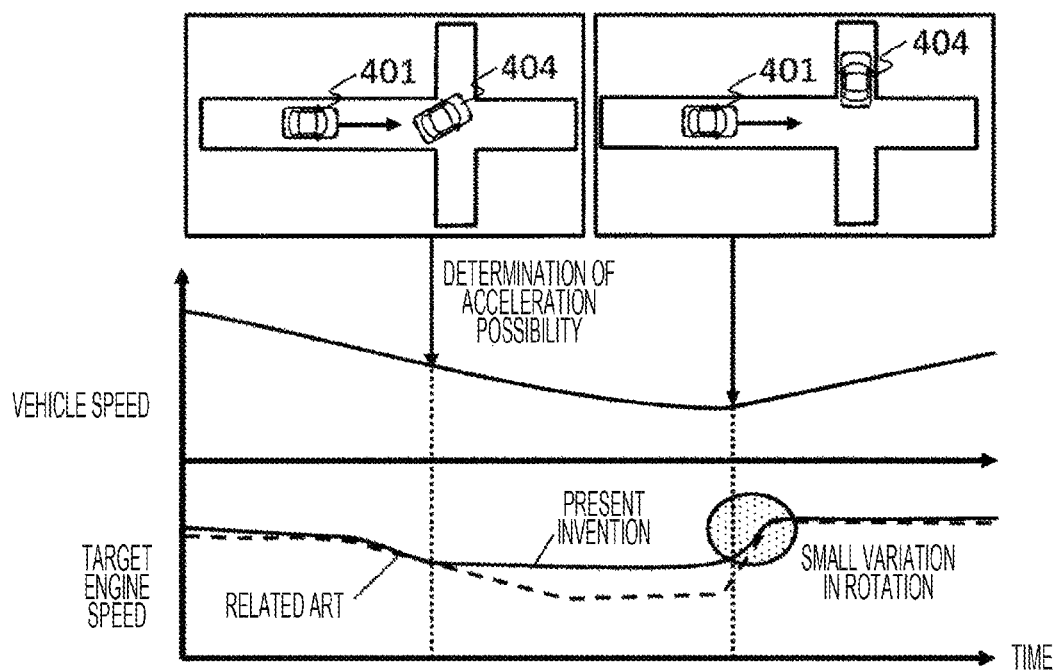
FIG. 20 is a time chart in determining acceleration possibility according to the second embodiment of the present invention.
Figure 21:
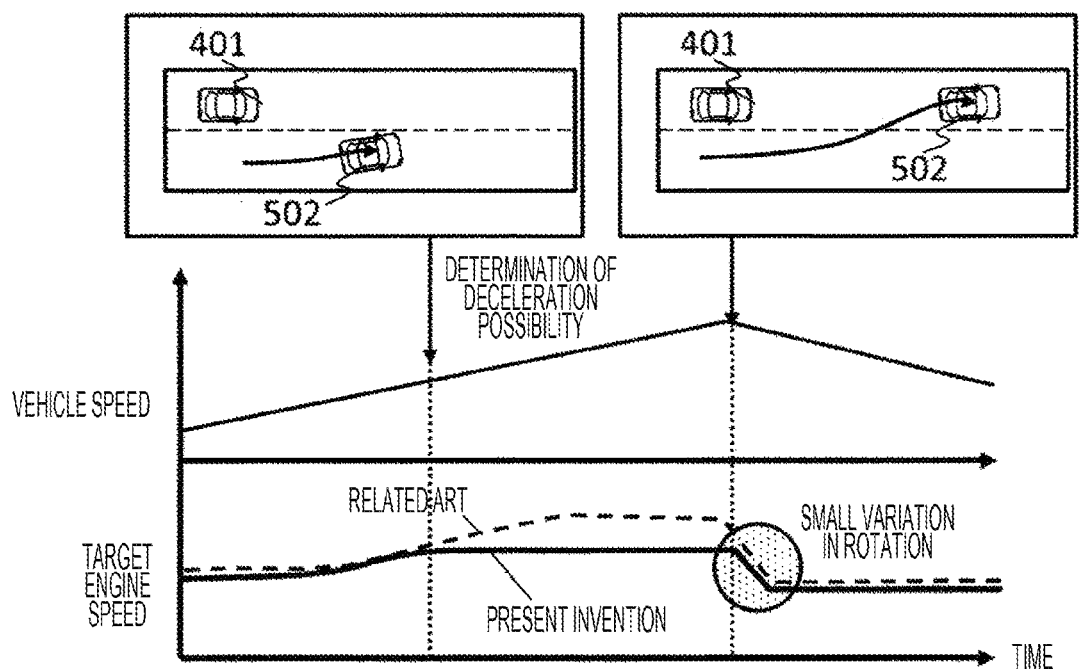
FIG. 21 is a time chart in determining deceleration possibility according to the second embodiment of the present invention.

FIG. 19 is a control block diagram of target engine speed calculation 209 according to a second embodiment of the present invention. Specifically, target engine speed 1601 in determination of an acceleration possibility is calculated on the basis of an acceleration possibility determination result, and target engine speed 1602 in determination of a deceleration possibility is calculated on the basis of a deceleration possibility determination result. In the target engine speed 1601 in determination of an acceleration possibility, on the basis of an acceleration possibility determination result, target engine speed is not increased to a target engine speed of optimum fuel consumption but maintained at a current engine speed, as illustrated in FIG. 20. This makes it possible to eliminate a variation in engine speed during acceleration possibility determination, and discomfort to the driver can be reduced. In the target engine speed 1602 in deceleration possibility determination, on the basis of a deceleration possibility determination result, target engine speed is not reduced to a minimum engine speed ensuring output but maintained at a current engine speed, as illustrated in FIG. 21. This makes it possible to eliminate a variation in engine speed during deceleration possibility determination, and discomfort to the driver can be reduced.

Third Embodiment

Figure 22:
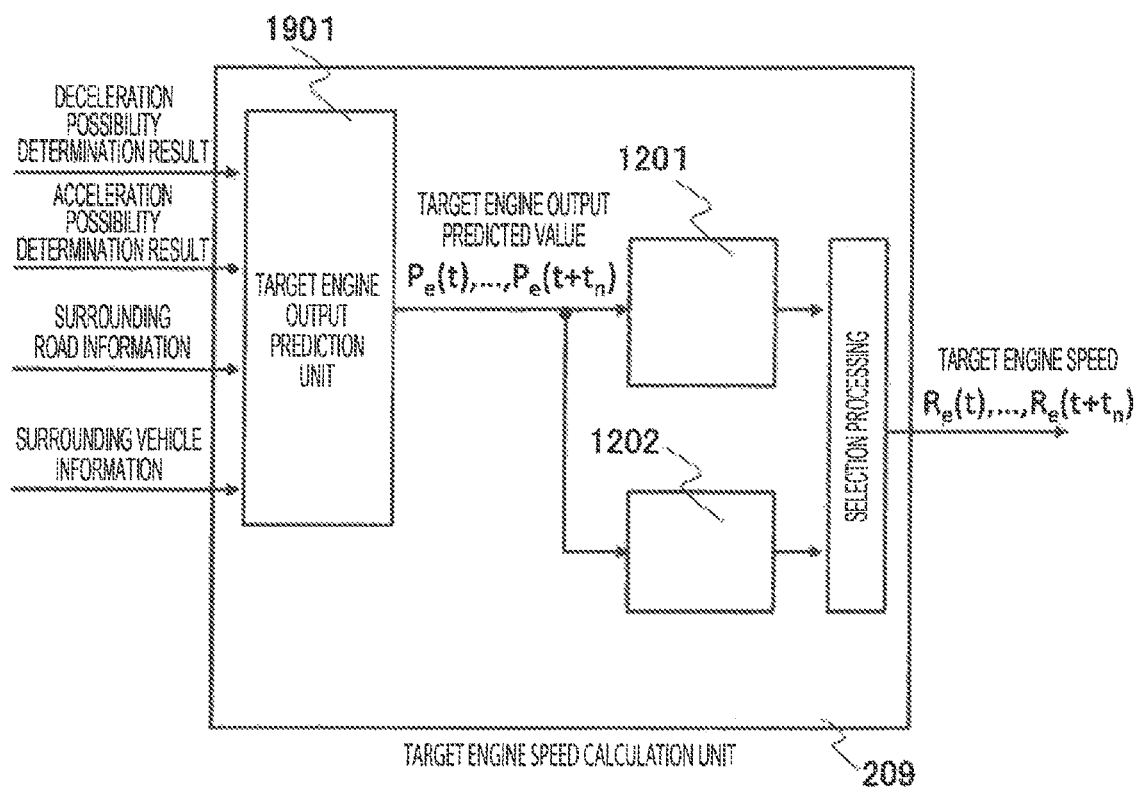
FIG. 22 is a block diagram illustrating calculation of target engine speed according to a third embodiment of the present invention.

In a third embodiment of the present invention, as illustrated in FIG. 22, a target engine output prediction unit 1901 is provided in target engine speed calculation 209. Specifically, it is assumed that motion of uniform acceleration is assumed on the basis of information about a preceding vehicle at time t (position $X_p(t)$, speed $V_p(t)$) and the position and speed of the preceding vehicle at time $t+t_n$ are calculated by using formulas (5) and (6).

[Mathematical Formula 1]

$$V_p(t+t_n)=V_p(t)+a_p t_n \quad (5)$$

$$X_p(t+t_n) = X_p(t) + \frac{V_p(t+t_n)^2 - V_p(t)^2}{2a_p} \quad (6)$$

Next, the position X and the speed V of a host vehicle are calculated using formulas (7) and (8).

[Mathematical Formula 2]

$$V(t+1)=V(t)+a_f(t) \quad (7)$$

$$X(t+1)=Z(t)+V(t+1) \quad (8)$$

On the basis of predicted values of the position and speed of the preceding vehicle and predicted values of the position and speed of the host vehicle, a predicted value D(t) of an inter-vehicle distance and a predicted value Vr(t) of a relative speed are calculated by using formulas (9) and (10).

[Mathematical Formula 3]

$$Vr(t)=V_p(t)-V(t) \quad (9)$$

$$D(t)=X_p(t)-X(t) \quad (10)$$

On the basis of the predicted value of the inter-vehicle distance and the predicted value of the relative speed, target driving force prediction values $F_a(t), \ldots, F_a(t+t_n)$ of the host vehicle are calculated by using the relationship illustrated in FIG. 6, and predicted values $P_e(t), \ldots, P_e(t+t_n)$ of target engine output are calculated according to formula (11). Here, when there is deceleration possibility determination in a time, $t_s$ to $t_{s+n}$ seconds, a target driving force prediction value $F_a(t_s+t_{s+n})$ at that time is set to a negative value, and when there is acceleration possibility determination in a time, $t_s$ to $t_{s+n}$ seconds, a target driving force prediction value $F_a(t_s+t_{s+n})$ at that time is set to a positive value.

[Mathematical Formula 4]

$$P_e(t+t_n)=F_a(t+t_n)\times V(t+t_n)(0\leq t_n\leq t_{max}) \quad (11)$$

Figure 23:
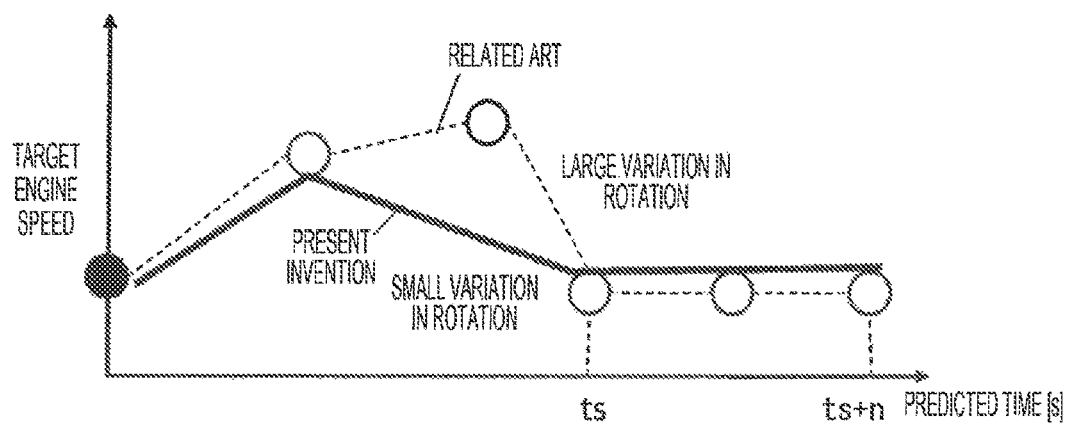
FIG. 23 is a time chart illustrating a method of correcting target engine speed according to a third embodiment of the present invention.

The target engine output predicted values $P_e(t), \ldots, P_e(t+t_n)$, a relationship 1201 for calculating a target engine speed of optimum fuel consumption from target engine output, and a relationship 1202 of a minimum engine speed ensuring constant output to target engine output are used to calculate a predicted value of target engine speed. As illustrated in FIG. 23, by correcting a target value to a predicted value of the target engine speed so that a large difference does not occur in target engine speed per unit time, a variation in engine speed is suppressed, and driving performance can be improved. Furthermore, the engine speed may be held until time t at which there is a deceleration or acceleration possibility, whereby a variation in engine speed can be suppressed and driving performance is improved.

REFERENCE SIGNS LIST 100 vehicle
101 engine
102 transmission
103 differential mechanism
104 wheels
105 starter motor
106 generator
107 drive belt
108 battery
109 vehicle-mounted electrical equipment
111 controller
112 accelerator pedal position detection unit
113 brake pedal position detection unit
114 vehicle speed detection unit
115 brake mechanism
116 torque converter
117 transmission oil pump
118 transmission mechanism
119 clutch mechanism
120 oil pump drive chain
121 engine speed sensor
122 transmission input rotation speed sensor
123 transmission output rotation speed sensor
124 electric oil pump for transmission
125 surrounding road information acquisition unit
126 surrounding vehicle information acquisition unit
201 acceleration/deceleration possibility determination unit
202 target driving force calculation unit
203 target vehicle state calculation unit
204 target engine output calculation unit
205 target brake torque calculation unit
206 engine fuel cut request calculation unit
207 clutch release request calculation unit
208 lock-up clutch release request calculation unit
209 target engine speed calculation unit
210 target gear ratio calculation unit

The invention claimed is:

1. A vehicle control unit comprising:
a surrounding vehicle information acquisition unit which acquires surrounding information around a host vehicle;
an acceleration/deceleration determination unit which determines whether or not an acceleration of the host vehicle is possible or whether or not a deceleration of the host vehicle is possible on the basis of surrounding information from the surrounding vehicle information acquisition unit;
a target engine speed calculation unit which reduces a target engine speed of the host vehicle relative to a predetermined target engine speed when the acceleration/deceleration determination unit determines that deceleration of the host vehicle is possible during acceleration to a target vehicle speed while the vehicle control unit is set in automatic acceleration/deceleration control;
an engine control unit which controls an engine of the host vehicle to have the target engine speed as reduced by the target engine speed calculation unit; and
a first acceleration mode and a second acceleration mode, the second acceleration mode having an acceleration level lower than an acceleration level of the first acceleration mode;
wherein the target engine speed calculation unit selects the first or second acceleration mode on the basis of a determination by the acceleration/deceleration determination unit of whether or not a deceleration of the host vehicle is possible, during acceleration.

2. The vehicle control unit according to claim 1, wherein the target engine speed calculation unit reduces the target engine speed to have an acceleration level lower than a predetermined acceleration level on the basis of a determination by the acceleration/deceleration determination unit that a deceleration of the host vehicle is possible, during acceleration.

3. The vehicle control unit according to claim 1, wherein in a case where engine output already reaches a target output when the acceleration/deceleration determination unit determines that a deceleration of the host vehicle is possible, the engine control unit controls the engine to have the target engine speed before reduction.

4. The vehicle control unit according to claim 1, wherein the acceleration/deceleration determination unit determines that a deceleration of the host vehicle is possible during acceleration on the basis of a distance to an intersection, traffic signal information, acceleration of a preceding vehicle, steering angle operation amount of the host vehicle, blinker operation of the host vehicle, distance to a curve, curvature of a curve, or position or speed of a vehicle moving parallel to the host vehicle.

5. The vehicle control unit according to claim 1, wherein the target engine speed calculation unit reduces the target engine speed to be not less than a minimum engine speed enabling target output to be output in acceleration.

6. The vehicle control unit according to claim 1, wherein in a case where engine output already reaches a target output when the acceleration/deceleration determination unit determines that a deceleration of the host vehicle is possible, the engine control unit controls the engine to have a target engine speed that optimizes fuel consumption.

7. The vehicle control unit according to claim 1, wherein the target engine speed of the host vehicle comprises a rotation speed of an output shaft associated with the engine of the host vehicle.

8. The vehicle control unit according to claim 1, wherein the target engine speed of the host vehicle comprises a rotation speed of the engine of the host vehicle.

9. A vehicle control unit comprising:
a surrounding vehicle information acquisition unit which acquires surrounding information around a host vehicle;
an acceleration/deceleration determination unit which determines whether or not an acceleration of the host vehicle is possible or whether or not a deceleration of the host vehicle is possible on the basis of surrounding information from the surrounding vehicle information acquisition unit;
a target engine speed calculation unit which increases a target engine speed of the host vehicle relative to a predetermined target engine speed when the acceleration/deceleration possibility determination unit determines that an acceleration of the host vehicle is possible during deceleration to a target vehicle speed while the vehicle control unit is set in automatic acceleration/deceleration control;
an engine control unit which controls an engine of the host vehicle to have the target engine speed as increased by the target engine speed calculation unit; and
a first deceleration mode and a second deceleration mode, the second deceleration mode having a deceleration level lower than a deceleration level of the first deceleration mode,
wherein the target engine speed calculation unit selects the first or second deceleration mode on the basis of a determination by the acceleration/deceleration determination unit of whether or not an acceleration of the host vehicle is possible, during deceleration.

10. The vehicle control unit according to claim 9, wherein the target engine speed calculation unit increases the target engine speed to have a deceleration level higher than a predetermined deceleration level on the basis of a determination by the acceleration/deceleration determination unit that an acceleration of the host vehicle is possible, during deceleration.

11. The vehicle control unit according to claim 9, wherein the acceleration/deceleration determination unit determines that an acceleration of the host vehicle is possible during deceleration on the basis of a distance to an intersection, traffic signal information, acceleration of a preceding vehicle, steering angle operation amount of the host vehicle, blinker operation of the host vehicle, or a road width.

12. The vehicle control unit according to claim 9, wherein the target engine speed of the host vehicle comprises a rotation speed of an output shaft associated with the engine of the host vehicle.

13. The vehicle control unit according to claim 9, wherein the target engine speed of the host vehicle comprises a rotation speed of the engine of the host vehicle.

\* \* \* \* \*